US011136165B1

(12) United States Patent
Heinzmann et al.

(10) Patent No.: US 11,136,165 B1
(45) Date of Patent: *Oct. 5, 2021

(54) MODULAR SHIPPING BASE

(71) Applicant: BIG 3 PRECISION PRODUCTS, INC., Centralia, IL (US)

(72) Inventors: Roger Heinzmann, Walnut Hill, IL (US); Alan Scheidt, Troy, IL (US); Joe Biagi, Centralia, IL (US)

(73) Assignee: Big 3 Precision Products, Inc., Centralia, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,118

(22) Filed: Nov. 29, 2020

Related U.S. Application Data

(63) Continuation of application No. 16/841,351, filed on Apr. 6, 2020, now Pat. No. 10,858,148, which is a continuation of application No. 29/728,029, filed on Mar. 16, 2020, now Pat. No. Des. 895,924.

(51) Int. Cl.
 *B65D 19/00* (2006.01)
(52) U.S. Cl.
 CPC ............. *B65D 19/0018* (2013.01); *B65D 2519/00024* (2013.01); *B65D 2519/00233* (2013.01); *B65D 2519/00273* (2013.01); *B65D 2519/00288* (2013.01); *B65D 2519/00542* (2013.01); *B65D 2519/00955* (2013.01)
(58) Field of Classification Search
 CPC .......... B65D 19/00; B65D 2519/00542; B65D 2519/00547; B65D 2519/00027; B65D 2519/00955; B65D 2519/00273; B65D 2519/00059; B65D 2519/00233

USPC ........ 108/51.11, 53.1, 53.3, 53.5, 57.2, 57.3, 108/57.32
See application file for complete search history.

(56) References Cited

U.S. PATENT DOCUMENTS

| | | | |
|---|---|---|---|
| 1,321,812 A | 11/1919 | Drumm | |
| 1,349,917 A | 8/1920 | Roberts | |
| 1,803,416 A | 5/1931 | Walp | |
| 1,832,774 A * | 11/1931 | Hallowell | B65D 19/0028 108/57.32 |
| 2,256,750 A | 9/1941 | Riemenschneider | |
| 2,639,112 A | 5/1953 | Cushman | |
| 2,691,499 A * | 10/1954 | Watts | B65D 19/0012 108/51.3 |
| 2,791,325 A * | 5/1957 | Schecter | B65D 85/42 206/419 |

(Continued)

*Primary Examiner* — Jose V Chen
(74) *Attorney, Agent, or Firm* — Mark A. Pitchford; Eric B. Fugett; Pitchford Fugett, PLLC

(57) ABSTRACT

A re-usable, returnable, stackable, modular shipping base incorporates replaceable components to make the base relatively quick and cost effective to repair. The shipping base is formed from a number of stamped or cut sheet materials (e.g., sheet metal) that are then folded and attached to one another using a tab system. When a component is damaged, the damaged component may be removed from the base and replaced with another mass produced, stamped sheet material component. Components are attached to one another via adhesive, stitch welding, skip welding, spot welding, or any other applicable process. Some components (e.g., a center support) may also be assembled using a tab (from the center support) and slot (in a deck pan) system.

50 Claims, 12 Drawing Sheets

(56) References Cited

U.S. PATENT DOCUMENTS

| | | | |
|---|---|---|---|
| 2,893,588 A * | 7/1959 | Martin | B65D 19/004 220/4.28 |
| 3,123,020 A | 3/1964 | Voissem | |
| 3,140,673 A | 7/1964 | Williams | |
| 3,180,288 A * | 4/1965 | McCowan | A47B 87/0246 108/101 |
| 3,207,095 A | 9/1965 | Hiatt, Jr. | |
| 3,428,003 A * | 2/1969 | Heffernan | B65D 19/38 108/53.3 |
| 3,438,342 A * | 4/1969 | Woolworth | B65D 19/0028 108/56.3 |
| 3,521,764 A * | 7/1970 | Loomis | B65D 21/0209 206/386 |
| 3,565,018 A | 2/1971 | Jay | |
| 3,616,766 A * | 11/1971 | Weiss | B65D 19/0097 108/57.18 |
| 3,804,033 A * | 4/1974 | Izawa | B65D 19/385 108/53.5 |
| 3,826,205 A | 7/1974 | Weiss | |
| 3,842,534 A | 10/1974 | Walters | |
| 4,051,786 A * | 10/1977 | Nordgren | B65D 19/0028 108/57.31 |
| 4,226,192 A | 10/1980 | Myers | |
| D258,948 S | 4/1981 | Stump | |
| 4,424,752 A * | 1/1984 | Aberg | B65D 19/004 108/57.3 |
| 4,674,414 A | 6/1987 | Fahrion | |
| 5,094,175 A | 3/1992 | Christie | |
| 5,211,117 A * | 5/1993 | Beamer | B65D 57/00 108/53.1 |
| 5,367,960 A * | 11/1994 | Schleicher | B65D 19/0095 108/57.32 |
| 5,647,284 A | 7/1997 | Frysinger | |
| 5,664,934 A * | 9/1997 | Schaede | B65D 71/0096 414/799 |
| 5,666,886 A * | 9/1997 | Alexander | B65D 19/0069 108/56.3 |
| 5,683,004 A * | 11/1997 | Aho | F16M 11/24 108/106 |
| 5,799,586 A * | 9/1998 | Casanovas | B65D 19/0028 108/51.3 |
| D404,179 S | 1/1999 | Apps et al. | |
| 5,918,551 A | 7/1999 | Liu | |
| 6,220,183 B1 * | 4/2001 | Schwitzky | B65D 19/0028 108/53.3 |
| 6,234,087 B1 | 5/2001 | Brown | |
| D464,186 S | 10/2002 | Medoff et al. | |
| 6,602,032 B2 | 8/2003 | Schutz | |
| 7,107,912 B2 | 9/2006 | Schutz | |
| 7,677,183 B2 * | 3/2010 | Borggaard | B65D 19/0014 108/51.11 |
| 7,739,965 B2 | 6/2010 | Heinrichs | |
| 7,779,763 B2 | 8/2010 | Valentinsson | |
| 7,908,980 B2 * | 3/2011 | Schmidt | B65D 77/0466 108/57.25 |
| 7,987,796 B2 * | 8/2011 | Nordstrom | B65D 19/0095 108/53.3 |
| 8,863,674 B2 * | 10/2014 | Smolenaers | B65D 19/40 108/51.11 |
| 9,045,267 B2 * | 6/2015 | Schutz | B65D 77/0466 |
| 9,394,079 B2 * | 7/2016 | Weyrauch | B65D 90/004 |
| 9,487,326 B2 | 11/2016 | Banik et al. | |
| 9,487,329 B2 | 11/2016 | Balazs et al. | |
| 9,580,237 B2 | 2/2017 | Nolan et al. | |
| D825,882 S | 8/2018 | Thompson | |
| 10,301,068 B2 | 5/2019 | Nottestad et al. | |
| 10,457,444 B2 | 10/2019 | Banik et al. | |
| D887,665 S | 6/2020 | Peng | |
| 10,858,148 B1 * | 12/2020 | Heinzmann | B65D 19/08 |
| D909,703 S * | 2/2021 | Heinzmann | B65D 19/0028 D34/38 |
| 2005/0061211 A1 | 3/2005 | Zeigler | |
| 2007/0215015 A1 * | 9/2007 | Heinrichs | B65D 19/06 108/53.1 |
| 2008/0295748 A1 | 12/2008 | Yoshida | |
| 2009/0263228 A1 | 10/2009 | Tygard | |
| 2011/0192327 A1 * | 8/2011 | Nordstrom | B65D 19/0095 108/57.32 |
| 2011/0265695 A1 * | 11/2011 | Moore | B65D 19/0095 108/53.3 |
| 2012/0037050 A1 * | 2/2012 | Nevo | B65D 19/0038 108/53.3 |
| 2012/0125802 A1 | 5/2012 | Rayner | |
| 2012/0160137 A1 | 6/2012 | Linares | |
| 2014/0069305 A1 | 3/2014 | Luis y Prado | |
| 2015/0158629 A1 * | 6/2015 | Harris | A47B 47/028 108/53.3 |
| 2018/0265249 A1 * | 9/2018 | Grutt | B65D 19/0012 |
| 2019/0092523 A1 | 3/2019 | Wu | |

\* cited by examiner

MODULAR SHIPPING BASE

This application is a continuation of U.S. patent application Ser. No. 16/841,351, filed Apr. 6, 2020 and entitled "MODULAR SHIPPING BASE," which claims priority to U.S. Patent Application Ser. No. 29/728,029 entitled "PALLET" and filed on Mar. 16, 2020, all of which are hereby incorporated by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to U.S. Patent Application Ser. No. 29/728,029 entitled "PALLET" filed on Mar. 19, 2020.

STATEMENT REGARDING FEDERALLY SPONSORED RESEARCH OR DEVELOPMENT

Not Applicable
REFERENCE TO SEQUENCE LISTING OR COMPUTER PROGRAM LISTING APPENDIX
Not Applicable

BACKGROUND OF THE INVENTION

The present invention relates generally to pallets or shipping bases. More particularly, this invention pertains to non-wooden, repairable shipping bases.

Materials and finished goods are generally shipped by truck, rail, boat, or aircraft. Unless lifting features are integral to the product packaging, shipping materials and finished goods requires some type of container or base that provides lifting features for equipment to load, unload or move the goods in transit from the supplier to the buyer. The most common lifting equipment for smaller unitized loads is the fork-truck or pallet truck, and the most common base is the wooden pallet (ladder or slat-style).

Alternatives to the wooden pallet design include injection molded plastic, heavy wood fiber board (cardboard) pallets (i.e., bases), and fabricated metal bases (cut and welded from standard steel or aluminum stock including rectangular tubing, angle iron, and channel). Most designs are simple platforms with enough depth to allow fork-truck access. Some designs include side panels to contain and protect loose bulk-loaded parts. Shipping bases in this class generally are produced in a limited number of "standardized" sizes (length/width), usually to accommodate maximum loading for the expected method of transportation. For instance, if over-the-road transportation by truck is expected, the base sizes will be chosen to be in units that allow full trailer/van bed coverage by bases placed side-by-side and front-to-back along the trailer, to maximize the amount of product being shipped on each trailer, which minimizes shipping costs on a per unit basis. The weight of the base is also important because shipping costs can be affected by the total weight being shipped, and the weight of the base adds to the total shipping weight and cost without adding to the amount of product actually delivered.

The cost of the various base designs, and their re-usability, vary by material and manufacturing method utilized. Wooden pallets are generally the least expensive, and are usually considered disposable or "one-way" shipping bases, as are heavy cardboard designs. Wooden pallets can certainly be reused, but the shipping and logistics costs to return them to a supplier can easily exceed the cost of new pallets. When re-used, they are most commonly re-used by the recipient to ship finished goods on to the buyer of those goods instead of being sent back to the supplier from which they were received. Injection-molded plastic bases are more expensive to produce, and fabricated metal bases are usually even more expensive. The more expensive a design is, the more they are generally intended to be reused and are often returned to the originator (i.e., supplier). Also, the more a particular style costs, the more incentive there is to be able to (cheaply) repair or refurbish them to keep them in service.

The simple wooden pallet can be easily repaired, but the logistics and labor costs associated with such repair often exceeds the cost of replacing the damaged pallet with a new pallet. Disposal of accumulated wooden pallets often becomes a costly issue in itself and is another incentive to ship products (i.e., materials, components, or finished goods) in re-usable (i.e., returnable) bases and pallets. Many businesses may store a number of wooden pallets for reuse, but unless they ship out products on pallets, these stored pallets are mainly used for utility or incidental purposes, not for shipping products.

Damage to shipping bases (e.g., pallets) is usually the result of mishandling by the fork truck or pallet truck operator, and usually consists of dented corners or sides, or missing structural material that has been knocked off or gouged out. Repair of injected molded bases is possible, but since their strength comes from the way the plastic is formed and webbed during the injection molding process, an effective and strong repair and bonding of missing material can be labor intensive and the cost is often a significant portion of a new base. Fully welded fabricated steel or aluminum bases can usually be repaired by cutting out the damaged area, cutting replacement stock, and welding in the replacing stock, but the cost of the repair material plus the skilled labor and tools required for the repair of these type bases is generally cost prohibitive. The skilled labor, tools, and material is usually less as a percentage of new base cost as compared to the injection molded bases, but this is mainly because the initial purchase price of fully welded fabricated bases is higher than the injection molded bases.

Another reason to use alternatives to wooden pallets and shipping bases or containers is that most overseas shipping requires non-organic pallets and shipping bases to reduce the possibility of transporting pests and parasites between countries in the shipping materials. Alternatively, shippers may use treated-wood pallets and containers. The wood treatment is to eliminate any infestation and is certified for such use. The wood used for this purpose is considerably more expensive that the "rough" wood used in wooden pallets for domestic shipping. Even at the elevated prices, these treated wood bases are still generally considered a "single use" option and not returnable to the supplier. Plastic and metal pallets and bases do not suffer from the same restrictions and are much simpler and less costly to prepare for international shipping.

Plastic bases are usually designed to be interlocked and stacked in a compact tower to reduce the volume required for return-shipping them and minimize the return shipping cost per unit. Shipping costs for returns is usually more a function of volume than weight. The bases are designed to fill shipping container (truck trailer or van, railcar, etc.)

volume, and because the plastic is less dense than metals or other materials, the weight of the bases does not affect shipping charges.

A shipping base may be a simple platform base, or it may include side panels and corner structures that create more of a box that protects the shipped item or contains loose parts or material for shipping. The side panel style is usually also designed to be stackable, where two or more assembled shipping bases are stacked on top of each other to reduce storage space.

A shipping base is designed to be structurally strong enough to handle a certain weight and provide access for handling equipment (fork truck, etc.), that products being shipped can be moved by during transportation, storage, and processing. When the configuration is that of a simple shipping base or pallet, the product being shipped is usually retained to the base by straps, banding, webbing, or stretch wrap.

Shipping bases or containers that incorporate side panels are generally of two types. One type of side panel base is referred to as a "collapsible base" since the side panels are designed to be folded down onto the empty base after use to minimize return shipping bulk. The panels are set back in place to create the open box configuration when the shipping base is being refilled or reloaded. This style can usually be stacked when loaded, but may be limited in how many levels can be stacked because of how the load is transferred to the next lower base. Many injection molded designs use the erected or collapsible side panels as the load bearing members to hold the container base(s) above, and the strength of these panels becomes the load limit determining factor. Other collapsible designs incorporate corner members that are structurally stronger than the side panels, and these designs can often handle more stacking weight than the side-panel only designs. A second type of side panel base has permanent fixed side panels that are part of the structure. This style is generally of the fabricated metal type, and is often used where very heavy products are shipped. This style requires the same transportation volume to return to the originator as it does when shipping product because the space occupied by the empty base is the same as the loaded base. This style usually can handle more stacking levels of loaded containers than the collapsible styles since the structure is more rigid, especially at the corners.

BRIEF SUMMARY OF THE INVENTION

Aspects of the present invention provide a re-usable, returnable, stackable, modular shipping base that incorporates replaceable components to make the base relatively quick and cost effective to repair. The shipping base is formed from a number of stamped or cut sheet materials (e.g., sheet metal) that are then folded and attached to one another using a tab system. When a component is damaged, the damaged component may be removed from the base and replaced with another mass produced, stamped sheet material component. Components are attached to one another via adhesive, stitch welding, spot welding, or any other applicable process. Some components (e.g., a center support) may also be assembled using a tab (from the center support) and slot (in a deck pan) system.

In one aspect, shipping base for supporting product during storage and transportation of the product includes a deck pan, a center support, a first corner support, a second corner support, and an endwall. The deck pan is configured to extend generally horizontally when the shipping base is in an upright position. The deck pan is configured to support the product for shipping on a top of said deck pan. The center support is configured to attach to a bottom at a center of the deck pan and space the deck pan from a surface supporting the shipping base when the shipping base is assembled and in the upright position. The first corner support is configured to attach to the bottom of the deck pan at a corner of the deck pan and at a front end of the shipping base and space the deck pan from the surface supporting the shipping base when the shipping base is assembled and in the upright position. The second corner support is configured to attach to the bottom of the deck pan at a corner of the deck pan and at the front end of the shipping base and space the deck pan from the surface supporting the shipping base when the shipping base is assembled and in the upright position. The endwall is configured to extend along the front end of the shipping base and engage the deck pan, first corner support, and second corner support when the shipping base is assembled and in the upright position.

In another aspect, a method of repairing a shipping base includes identifying a damaged component of the shipping base. The shipping base component includes at least one of a deck pan, a center support, a first corner support, a second corner support, and endwall, a third corner support, a fourth corner support, a second endwall, a third endwall, a fourth endwall, a first side support, a second side support, a third side support, a fourth side support, a first corner post, a second corner post, a third corner post, or a fourth corner post. The deck pan is configured to extend generally horizontally when the shipping base is in an upright position. The deck pan is configured to support the product for shipping on a top of said deck pan. The center support is configured to attach to a bottom at a center of the deck pan and spaced the deck pan from a surface supporting the shipping base when the shipping base is assembled and in the upright position. The first corner support is configured to attach to the bottom of the deck pan at a corner of the deck pan and at a front end of the shipping base and spaced the deck pan from the surface supporting the shipping base when the shipping base is assembled and in the upright position. The second corner support is configured to attach to the bottom of the deck pan at a corner of the deck pan and at the front end of the shipping base and spaced the deck pan from the surface supporting the shipping base when the shipping base is assembled and in the upright position. The endwall is configured to extend along the front end of the shipping base and engage the deck pan, first corner support, and second corner support when the shipping base is assembled and in the upright position. The broken component is removed by detaching at least one tab connecting the component to at least one adjacent component. An undamaged component is received corresponding to the damaged component, and at least one tab of the undamaged component is attached to the at least one adjacent component or at least one tab of the adjacent component is attached to the undamaged component.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
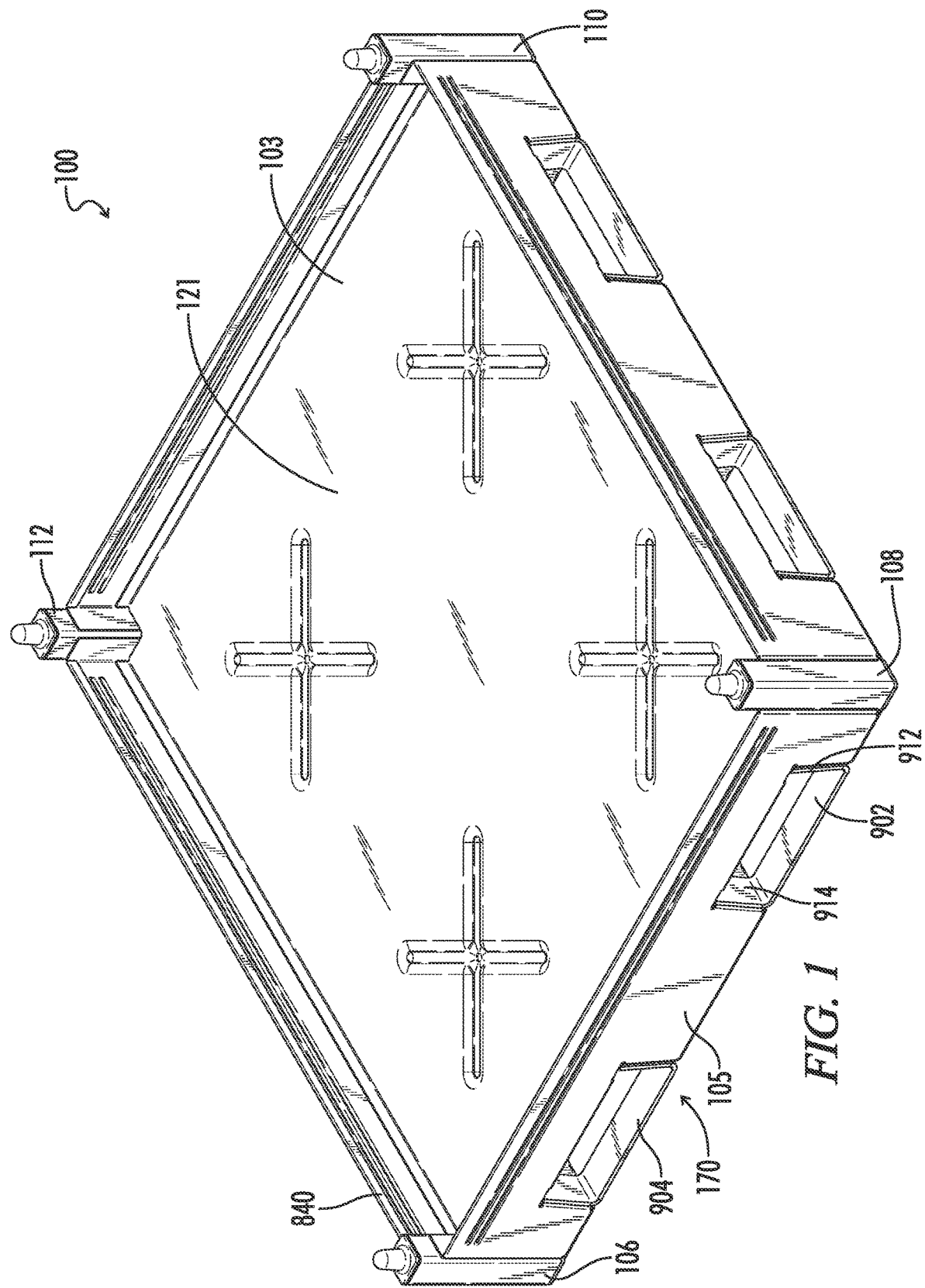
FIG. 1 is an isometric view of a modular shipping base according to one embodiment of the invention.
Figure 2:
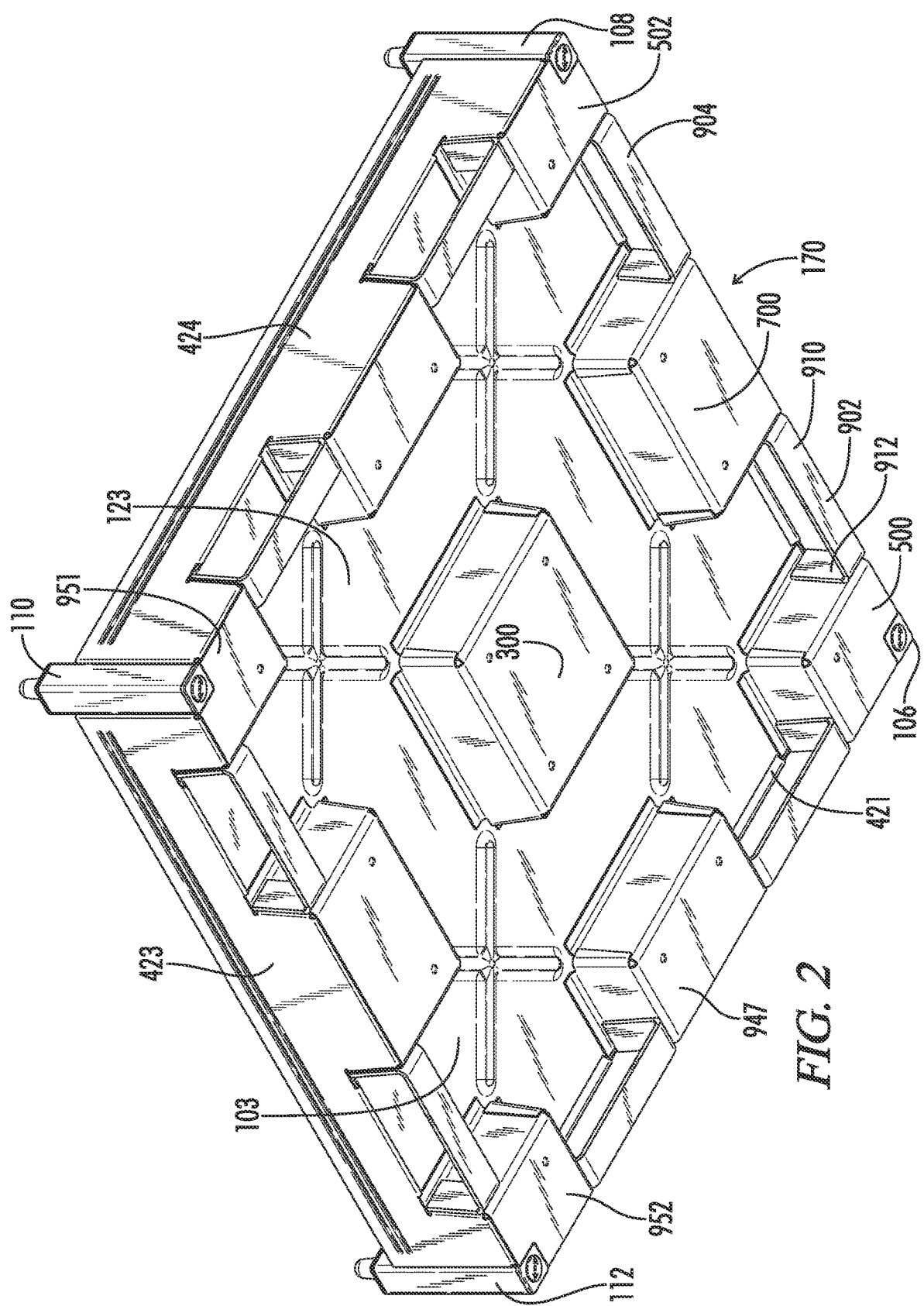
FIG. 2 is an elevated perspective view of the shipping base of FIG. 1.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component. As used herein, the upright position of the shipping base 100 is considered to be as shown for example, in FIG. 1 with supports of the shipping base 100 in contact with a generally flat, horizontal surface supporting the shipping base 100 such that the shipping base 100 will contain or support any product placed on a deck pan 103 of the shipping base 100. An endwall 105 and corner posts 106, 108, 110, and 112 of the shipping base 100 extend generally vertically upward from the surface supporting the shipping base 100 when the shipping base 100 is in the assembled and upright position as shown in FIG. 1. As used herein, generally vertical does not necessarily mean at a 90° angle to the surface supporting the shipping base 100. For many of the sidewalls of the components of the shipping base, additional strength may be obtained by having generally vertical surfaces angled out at between about 5 and 20 degrees from perfectly vertical from the surface supporting the shipping base 100 or from the deck pan 103 of the shipping base 100. Endwall 105 is described herein as being a front wall of the shipping base 100 defining a front 170 of the shipping base 100, and all components of the shipping base 100 are described with reference to the endwall 105 being the front 170. However, it should be apparent to one of ordinary skill in the art that any of the endwalls of the shipping base 100 may be designated as the front 170 of the shipping base 100 while the rest of the components of the shipping base 100 are described with respect to that endwall. Similarly, the claims and description herein apply whether the shipping base 100 is considered to be equal in width and depth or longer in either the lateral or longitudinal direction.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

Referring now to FIGS. 1-9 and 11-14, a shipping base 100 for supporting product during storage and transportation of the product includes a deck pan 103, a center support 300, a first corner support 500, a second corner support 502, and an endwall 105. The deck pan 103 is configured to extend generally horizontally when the shipping base 100 is assembled and in the upright position. The deck pan 103 is configured to support the product for shipping on a top 121 of the deck pan 103.

Figure 4:
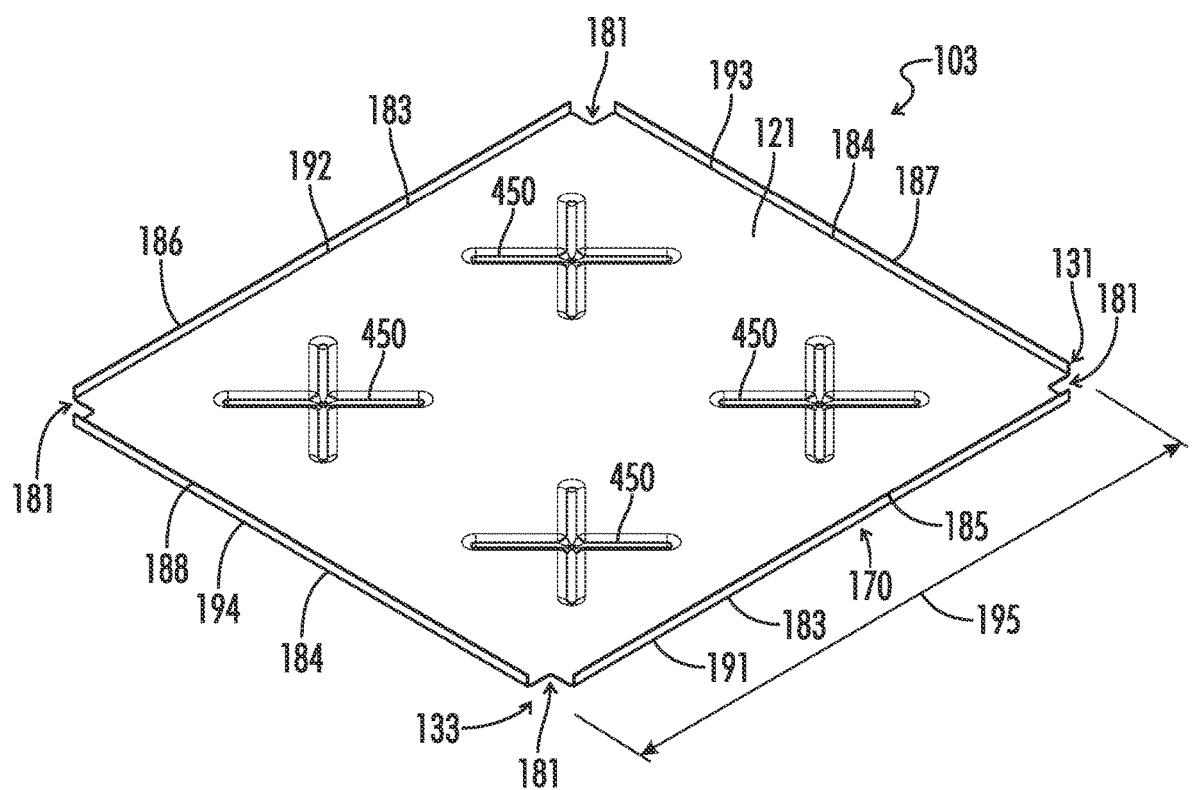
FIG. 4 is an isometric view of a deck pan of the shipping base of FIG. 1.

Referring especially to FIG. 4, in one embodiment, the deck pan 103 is generally rectangular and includes a cutout 181 at each corner (e.g. first corner 131 and second corner 133) configured to receive a corner post 106 of the shipping base 100. In one embodiment, the deck pan 103 includes a first pair of opposing edges 183 and a second pair of opposing edges 184, a surface 121, a first tab 185, a second tab 186, a third tab 187, and a fourth tab 188. The surface 121 is configured to support the product during storage and transportation of the product. The first tab 185 extends generally vertically from the surface 121 of the deck pan 103 at a first edge 191 of the first pair of opposing edges 183 when the shipping base 100 is assembled and in the upright position. The second tab 186 extends generally vertically from the surface 121 of the deck pan 103 at a second edge 192 of the first pair of opposing edges 183 when the shipping base 100 is assembled and in the upright position. The third tab 187 extends generally vertically from the surface 121 of the deck pan 103 at a second edge 193 of the second pair of opposing edges 184 when the shipping base 100 is assembled and in the upright position. The fourth tab 188 extends generally vertically from the surface 121 of the deck pan 103 at a second edge 194 of the second pair of opposing edges 184 when the shipping base 100 is assembled and in the upright position. In one embodiment, the first second third and fourth tabs 185, 186, 187, and 188 extend upwardly. It is also contemplated within the scope of the claims that the first, second, third, and fourth tabs 185, 186, 187, and 188 may extend downwardly (whether perfectly vertically or merely generally vertically). In one embodiment, the first tab 185 is configured to attach to the endwall 105 when the shipping base 100 is assembled. In one embodiment, the endwall 105 forms a front 170 of the shipping base 100, and the endwall 105 is a first endwall. The shipping base 100 further includes a second endwall 421, a third endwall 423, and a fourth endwall 424. The second tab 186 is configured to attach to the second endwall 421, the third tab 187 is configured to attach to the third endwall 423, and the fourth tab 188 is configured to attach to the fourth and wall 424 when the shipping base 100 is assembled.

In one embodiment, the surface 121 of the deck pan 103 is embossed to stiffen the surface 121 (and overall deck pan 103). In one embodiment, the deck pan 103 is generally rectangular such that the deck pan 103 surface 121 has quadrants. The surface 121 has an embossment 450 in each quadrant. In one embodiment, each embossment 450 is generally X-shaped.

Figure 3:
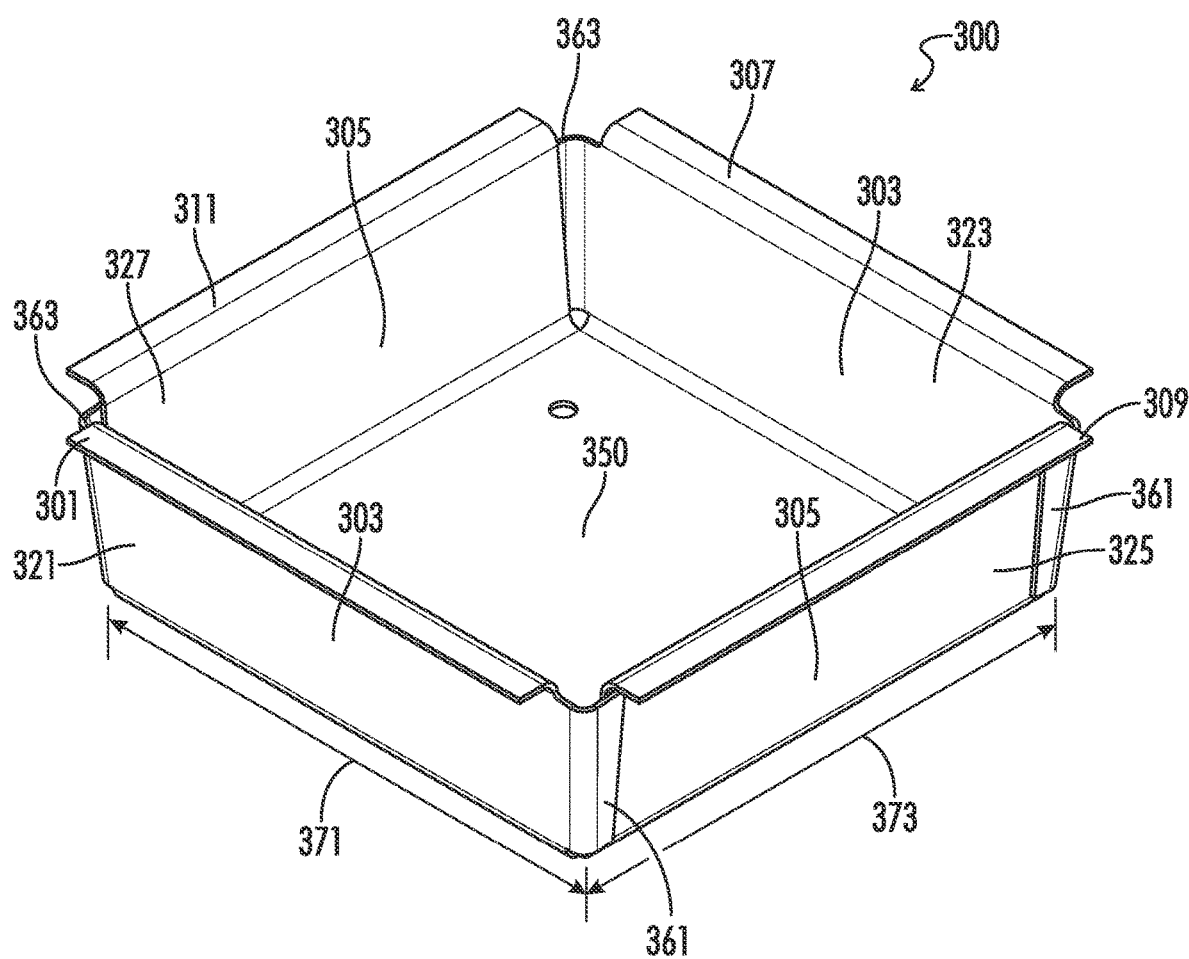
FIG. 3 is an isometric view of a center support of the shipping base of FIG. 1.

Referring especially to FIG. 3, the center support 300 is configured to attach to a bottom 123 of the deck pan 103 at a center of the deck pan 103 and spaced the deck pan 103 from a surface supporting the shipping base 100 when the shipping base 100 is assembled and in the upright position. In one embodiment, the center support 300 includes a horizontal tab 301 extending generally horizontally at the top of the center support 300 the horizontal tab 301 is attached to the deck pan 103 when the shipping base 100 is assembled and in the upright position. In one embodiment, the center support 300 includes a first pair of opposing side walls 303 extending generally vertically when the shipping base 100 is assembled and in the upright position. The center support 300 further includes a second pair of opposing side walls 305 extending generally vertically when the shipping base 100 is assembled and in the upright position. Horizontal tabs 301, 307, 309, 311 extend generally horizontally and outwardly from each side wall 321, 323, 325, 327 of the center support 300 at the top of the center support 300. Each tab 301, 307, 309, 311 is attached to the bottom 123 of the deck pan 103 when the shipping base 100 is assembled. In one embodiment, the center support 300 includes a piece of sheet metal stamped or cut to shape and folded to form a bottom 350, a first pair of opposing side walls 303, and a second pair of opposing side walls 305. Each side wall 321, 323 of the first pair 303 of opposing side walls includes opposing lateral tabs 361, 363. A first lateral tab 361 of the opposing lateral tabs is configured to attach to a first side wall 325 of the second pair of opposing side walls 305, and a second lateral tab 363 of the opposing lateral tabs is configured to attach to the second side wall 327 of the second pair of opposing side walls 305 such that the lateral tabs 361, 363 when attached maintain the center support 300 and a generally open top box configuration. In one embodiment, the center support 300 includes a first pair of opposing side walls 303 extending generally vertically when the shipping base 100 is assembled and in the upright position and a second pair of opposing side walls 305 extending generally vertically when the shipping base 100 is assembled and in the upright position. A lateral length 371 of the first pair of opposing side walls 303 at a bottom 350 of the center support is the same as a longitudinal length of the second pair of opposing side walls 305 at the bottom 350 of the center support 300. In other words, in one embodiment, the center support 300 forms a generally symmetrical open top box shape and has a generally square bottom 350.

Figure 5:
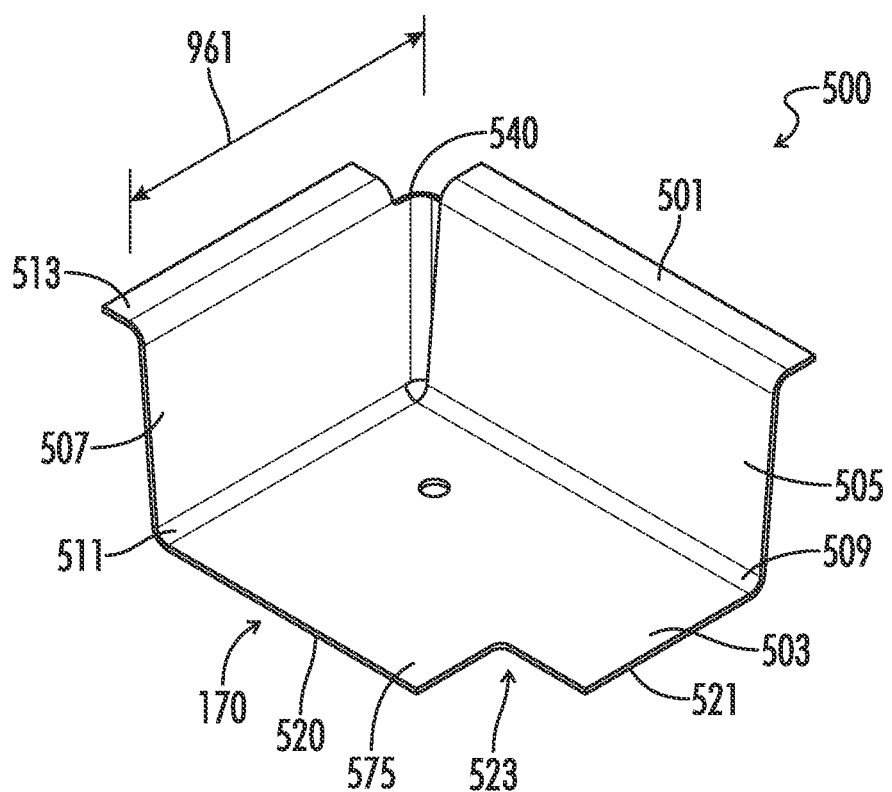
FIG. 5 is an isometric view of a first corner support of the shipping base of FIG. 1.

Referring especially to FIG. 5, the first corner support 500 is configured to attach to the bottom 123 of the deck pan 103 at a corner 131 of the deck pan 103 and at the front end 170 of the shipping base 100 and spaced the deck pan 103 from the surface supporting the shipping base 100 when the shipping base 100 is assembled and in the upright position. In one embodiment, the first corner support 500 includes a horizontal tab 501 extending generally horizontally at the top of the first corner support 500. The horizontal tab 501 is attached to the deck pan 103 when the shipping base 100 is assembled and in the upright position. In one embodiment, the first corner support includes a bottom 503, a first side wall 505, and a second side wall 507. The bottom 503 is configured to contact the surface supporting the shipping base 100 when the shipping base 100 is assembled and in the upright position. The bottom 503 is generally rectangular such that the bottom 503 has 4 edges (i.e., at least 4 edges). The first side wall 505 is configured to extend upwardly from the bottom 503 along a first edge 509 of the 4 edges of the bottom 503 when the first corner support 500 is in the upright position. The second side wall 507 is configured to extend upwardly from the bottom 503 along a second edge 511 of the 4 edges of the bottom 503 when the first corner support 500 is in the upright position. The first edge 509 is adjacent, meets, or connects with the second edge 511. In one embodiment, the tab 501 is a first horizontal tab 501 extending generally horizontally from the top of the first side wall 505 and is attached to the deck pan 103 when the shipping base 100 is assembled and in the upright position. The first corner support 500 further includes a second horizontal tab 513 extending generally horizontally from the top of the second side wall 507 and attached to the deck pan 103 when the shipping base is assembled and in the upright position. In one embodiment, a third edge 520 and a fourth edge 521 of the 4 edges of the generally rectangular bottom 503 of the corner support 500 do not meet such that a cutout 523 is formed in the generally rectangular bottom 503. The cutout 523 or recess is configured to receive a corner post 106 of the shipping base 100. In one embodiment, first corner support 500 is formed from a piece of sheet metal stamped or cut. The first side wall 505 includes a lateral tab 540 configured to attach to the second side wall 507 such that the lateral tab 540 retains the first and second side walls 505, 507 generally perpendicular (e.g., generally vertical or nearly vertical) to the bottom 503 of the corner support 500 when attached. The first corner support 500 spaces the deck pan 103 from the surface supporting the shipping base 100 the same distance as the center support 300 spaces the deck pan 103 from the surface supporting the shipping base when shipping base 100 is assembled and in the upright position and supported by the surface.

The second corner support 502 is configured to attach to the bottom 123 of the deck pan 103 at a second corner 133 of the deck pan 103 and at the front end 170 of the shipping base 100 and space the deck pan 103 from the surface supporting the shipping base 100 when the shipping base 100 is assembled and in the upright position. It should be apparent from the specification and drawings herein to one of skill in the art that the second corner support 502 has a construction similar to the first corner support 500, except mirrored such that the second corner support 502 fits into a different corner of the shipping base 100 than the first corner support 500.

Figure 6:
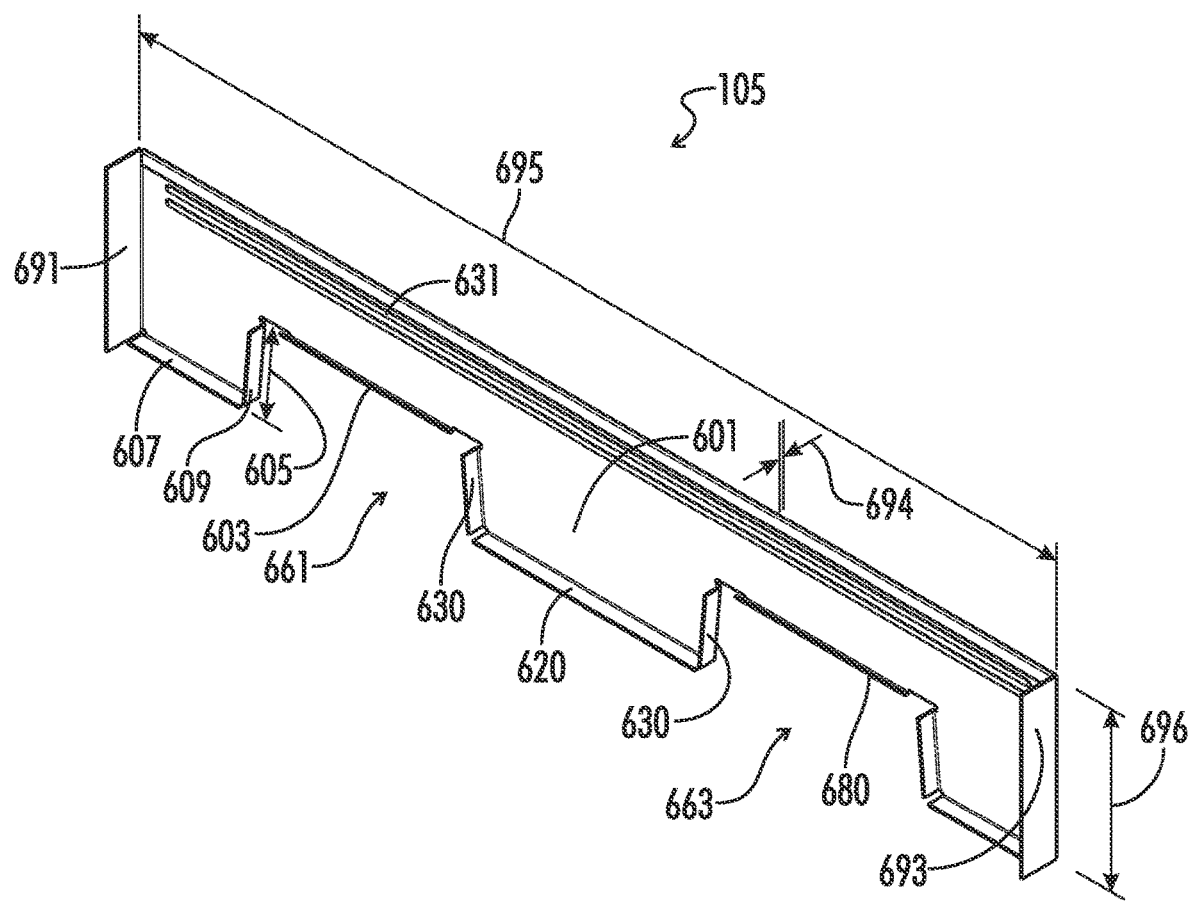
FIG. 6 is a rear isometric view of an endwall of the shipping base of FIG. 1.

Referring especially to FIG. 6, the endwall 105 is configured to extend along the front end 170 of the shipping base 100 and engage the deck pan 103, first corner support 500, and second corner support 502 when the shipping base 100 is assembled and in the upright position. In one embodiment, the endwall 105 is the front endwall. That is, the endwall 105 forms the front 170 of the shipping base 100. In one embodiment, the endwall 105 includes a main wall 601 and a deck tab 603. The main wall 601 is configured to extend laterally from the first corner support 500 to the second corner support 502 when the shipping base 100 is assembled. The deck tab 603 is configured to extend rearwardly from the main wall 601 when the shipping base 100 is assembled. The next tab 603 has a height 605 equal to a distance which the center support 300 spaces the deck pan 103 from the surface supporting the shipping base 100. The deck tab 603 is configured to attach to the bottom 123 of the deck pan 103 when the shipping base 100 is assembled and in the upright position. In one embodiment, the endwall 105 further includes a bottom corner support tab 607 extending rearwardly from a bottom of the main wall 601 when the shipping base 100 is assembled and in the upright position. The bottom corner support 607 is configured to attach to a top surface 575 of the bottom 503 of the first corner support 500 when the shipping base 100 is assembled and in the upright position. In one embodiment, the endwall 105 further includes a side corner support tab 609 extending rearwardly from the main wall 601 when the shipping base 100 is assembled and in the upright position. The side corner support tab 609 is configured to attach to the second side wall 507 of the first corner support 500 when the shipping base 100 is assembled. In one embodiment, the endwall 105 further includes a bottom side support tab 620 extending rearwardly from the main wall 601 when the shipping base 100 is assembled and in the upright position. The bottom side support tab 620 extends from a bottom of the main wall 601 and is configured to attach to a top surface 702 of a bottom 704 of the side support 700 of the shipping base 100 when the shipping base 100 is assembled and in the upright position. In one embodiment, the endwall 105 further includes a pair of side side support tabs 630 extending rearwardly from the main wall 601 when the shipping base 100 is assembled and in the upright position. Each side side support tab 630 is configured to attach to a different side wall 709, 710 of the side support 700 of the shipping base 100 when the shipping base 100 is assembled and in the upright position. In one embodiment, the main wall 601 is configured to extend laterally from the first corner support 500 to the second corner support 502 when the shipping base 100 assembled. The main wall 601 has an embossment 631 extending laterally along the main wall 601 at a height above the deck pan 103 when the shipping base 100 is assembled and in the upright position. In one embodiment, the endwall 105 has a pair of recesses 661 and 663 configured to receive forks for lifting or moving the shipping base 100. A first recess 661 of the pair of recesses is between where the endwall 105 attaches to the first corner support 500 and the side support 700. The second recess 663 of the pair of recesses is between where the endwall 105 attaches to the side support 700 and the second corner support 502. The deck tab 603 is a first deck tab defining a top of the first recess 661, and the endwall 105 further includes a second deck tab 680 defining a top of the second recess 663. In one embodiment, the main wall 601 is configured to extend laterally between the first corner support 500 and second corner support 502 when the shipping base 100 is assembled. A pair of corner post tabs 691, 693 extend rearwardly and vertically from the main wall 601 when the shipping base 100 is assembled and in the upright position to form lateral ends of the main wall 601. Each corner post tabs 691, 693 is configured to attach to a corner post (e.g. corner posts 106, 108 respectively) of the shipping base 100 when the shipping base 100 is assembled and in the upright position. In one embodiment, the main wall 601 has a lateral length 695 less than a lateral length 195 of the deck pan 103 by approximately a total lateral length 802 of the corner posts 106, 108 less double the thickness 694 of the main wall 601 of the endwall 105.

Figure 7:
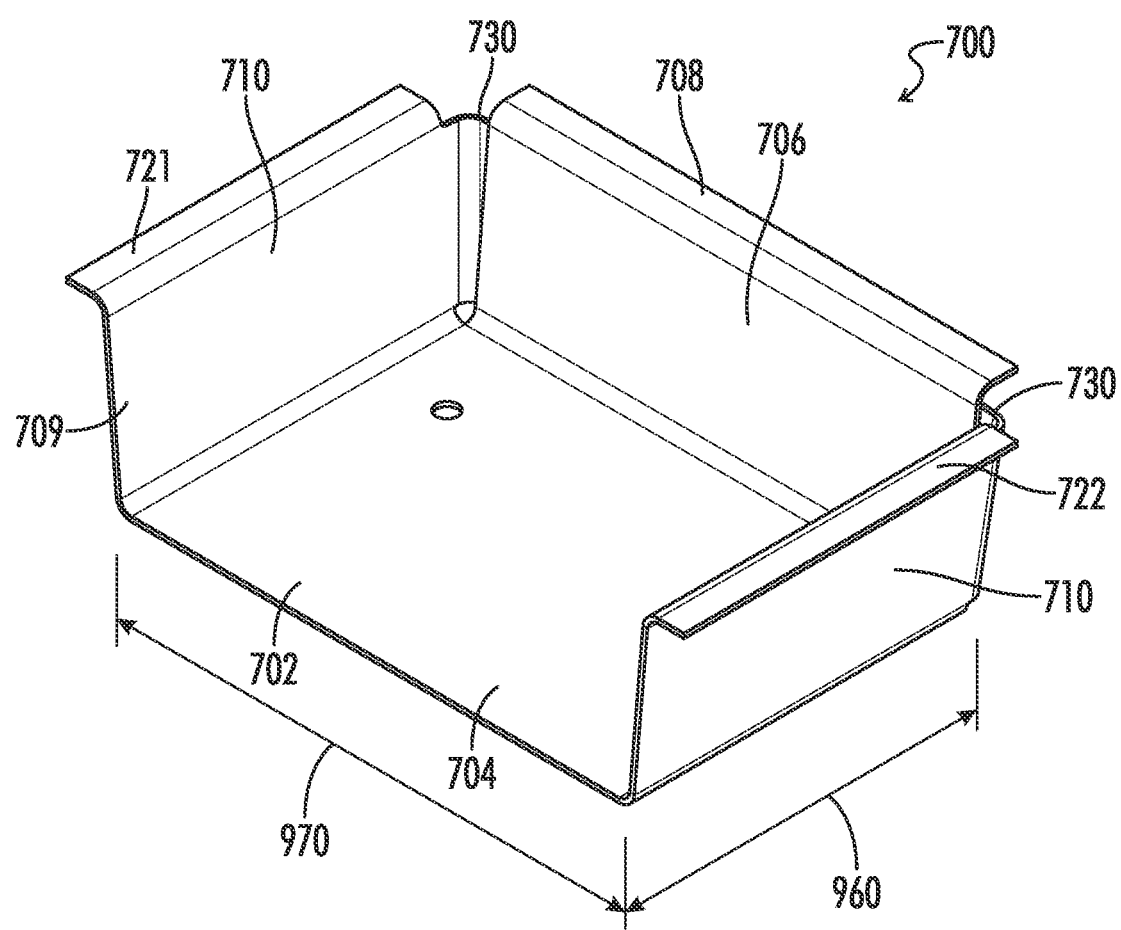
FIG. 7 is a rear isometric view of a side support of the shipping base of FIG. 1.

Referring especially to FIG. 7, in one embodiment, the shipping base 100 further includes a side support 700. The side support 700 is configured to attach to the deck pan 103 and endwall 105 and space the deck pan 103 from the surface supporting the shipping base 100 when the shipping base 100 is assembled and in the upright position. The side support 700 spaces the deck pan 103 from the surface supporting the shipping base 100 the same distance as the center support 300 spaces the deck pan 103 from the surface supporting shipping base 100 when the shipping base 100 is assembled in the upright position and supported by the surface. The side support 700 includes a bottom 702, a rear wall 706, and a tab 708. The rear wall 706 extends upwardly from the bottom 702 when the shipping base 100 is assembled and in the upright position. The tab 708 extends horizontally from a top of the rear wall 706, and the tab 708 is configured to attach to the deck pan 103 when the shipping base 100 is assembled and in the upright position. In one embodiment, the bottom 702 of the side support 700 is configured to attach to the bottom side support tab 620 of the endwall 105 when the shipping base 100 is assembled. In one embodiment, the side support 700 includes a pair of opposing side walls 710. A first side wall 709 of the pair of opposing side walls extends upwardly from the bottom 702 of the side support 700 when the shipping base is assembled and in the upright position. A second side wall 710 of the pair of opposing side walls extends upwardly from the bottom 702 when the shipping base is assembled and in the upright position. In one embodiment, the side support 700 further includes a first deck pan tab 721 extending generally horizontally and outwardly from the first side wall 709 when the shipping base 100 is assembled in the upright position. The first deck pan tab 721 is configured to attach to a bottom of the deck pan 103 when the shipping base 100 is assembled and in the upright position. The second deck pan tab 722 extends generally horizontally and outwardly from the second side wall 710 when the shipping base is assembled and in the upright position. The second deck pan tab 722 is configured to attach to the bottom of the deck pan 103 when the shipping base 100 is assembled and in the upright position. In one embodiment, each side wall 709, 710 of the pair of opposing side walls has a rear wall tab 730 configured to attach to the rear wall 706 of the side support 700 when the shipping base 100 is assembled. In one embodiment, the side support 700 is formed by stamping and/or cutting and folding a piece of sheet metal. When the rear wall tabs 730 are connected to the rear wall 706, they maintain the side support 700 with the sidewalls 709, 710 and rear wall 706 nearly perpendicular to the bottom 702.

Figure 8:
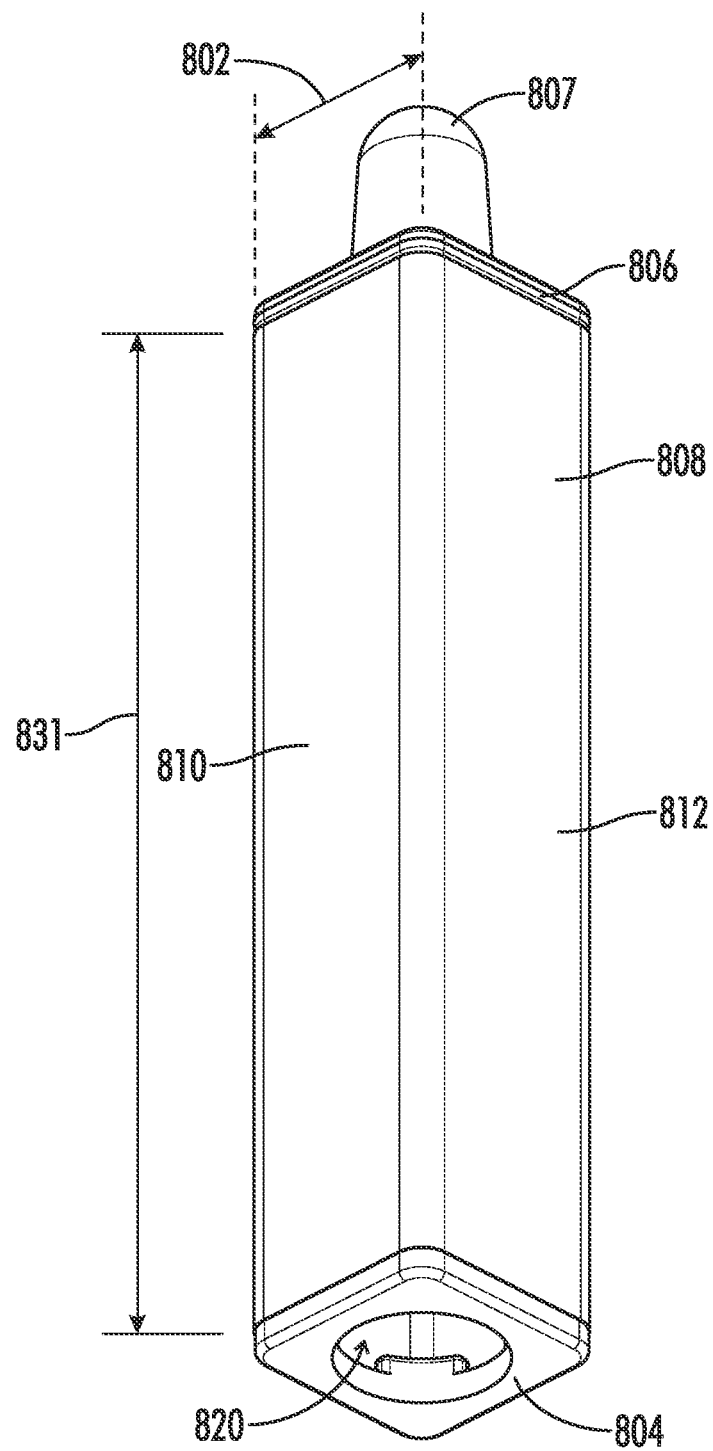
FIG. 8 is an elevated isometric view of a corner post of the shipping base of FIG. 1.
Figure 9:
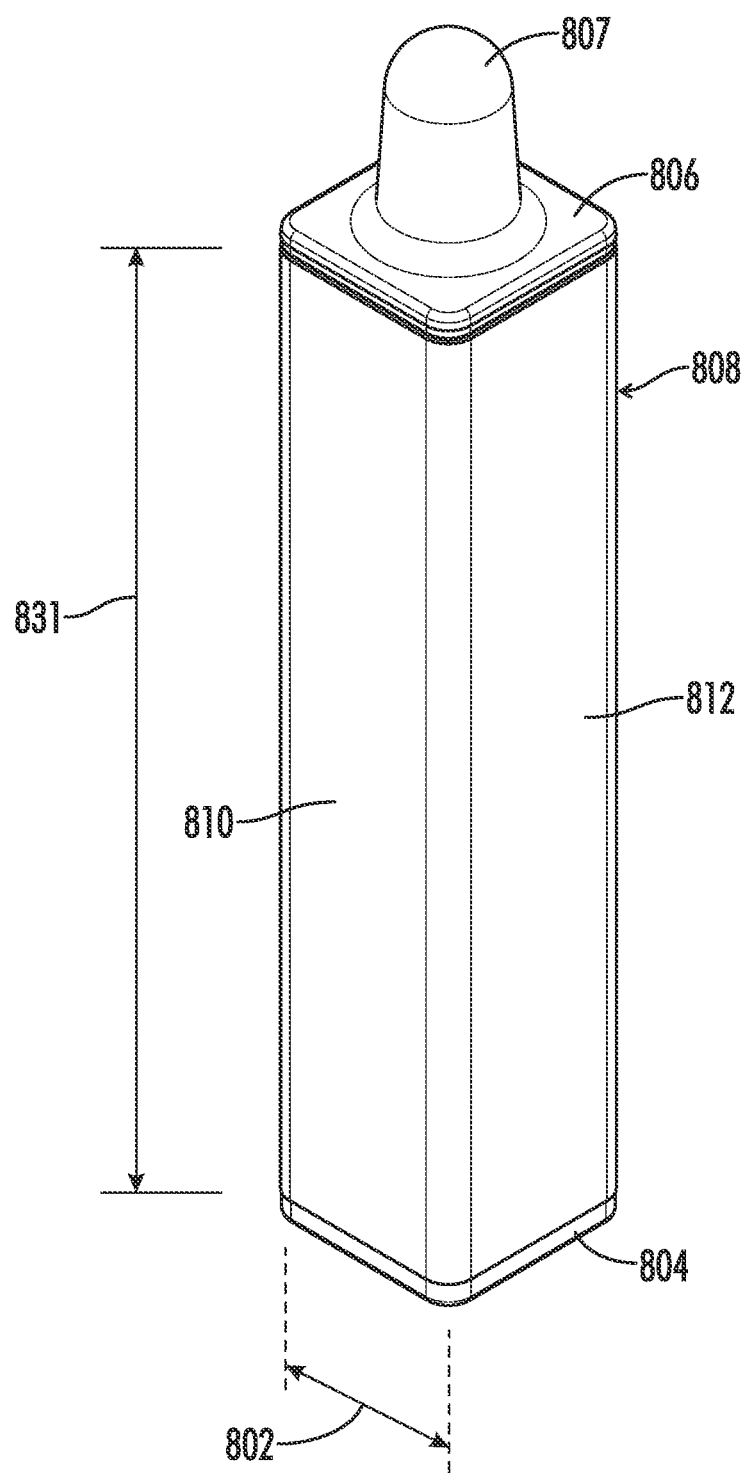
FIG. 9 is a depressed isometric view of a corner post of the shipping base of FIG. 1.

Referring especially to FIGS. 8 and 9, in one embodiment, the shipping base 100 further includes a corner post 106. In one embodiment, the corner post includes a rectangular tube body 808, an end cap 804, and a post cap 806. The rectangular tube body 808 is configured to extend upwardly at a corner 131 of the deck pan 103. The body has a first flat side 810 configured to attach to the corner post tab 691 of the endwall 105 when the shipping base 100 is assembled. The body has a second flat side 812 adjacent the first flat side 810 configured to attach to a corner post tab of a second endwall 840 when the shipping base 100 is assembled. In this description, the first endwall 105 is described as the front 170 of the shipping base 100 such that the second endwall 840 is a side wall of the shipping base 100, however, it should be apparent to one of ordinary skill in the art that the second and wall 840 could be considered the front of the shipping base 100 such that the second endwall 840 is the front wall of the shipping base 100 while the first endwall 105 is a side wall of the shipping base 100. The endcap 804 is at a bottom end of the corner post 106. The endcap 804 has a recess 820 configured to receive a post cap 806 of a corner post of another shipping base upon which the shipping base 100 is properly stacked is assembled and in the upright position. In one embodiment, the recess 820 is a hole through the endcap 804 of the corner post 106. In one embodiment, the post cap 806 includes a protrusion 807 configured to extend into the recess in an endcap of a corner post of another shipping base properly stacked on shipping base 100 when the shipping base 100 is assembled in the upright position. In one embodiment, the rectangular tube body 808 is configured to extend upwardly at the corner 131 of the deck pan 103 when the shipping base 100 is assembled and in the upright position. The rectangular body 808 has a height 831 at least as great as a height 696 of the endwall 105.

In one embodiment, the shipping base 100 further includes safety straps enclosing the first and second recesses 661, 663 of the endwall 105 to forks in the recesses should the shipping base 100 shift or slip. The shipping base 100 includes a first strap 902 configured to extend between the first corner support 500 and the side support 700. In one embodiment, the first strap 902 has a bottom section 910 approximately equal in height to a bottom of the first corner support when the shipping base 100 is assembled and in the upright position on the surface supporting the shipping base. In one embodiment, a second strap 904 is configured to extend between the second corner support 502 and the side support 700. In one embodiment, each strap has a first upright section 912 configured to extend upwardly from the bottom section 910 along a side wall of an adjacent corner support and attached to said side wall. Each strap also has a second upright section 914 configured to extend upwardly from the bottom section 910 along a side wall of the side support 700 and attached to the side wall of the side support 700.

In one embodiment, a longitudinal depth 960 of the side support 700 is the same as a longitudinal depth 961 of the first corner support 500 and a longitudinal depth of the second corner support 502. In one embodiment, the side support 700 has a lateral width 970 equal to a lateral width 371 of the center support 300. In one embodiment, the second endwall 421 adjacent the first endwall 105 has a second side support 947 attached thereto. The second side support has a longitudinal depth equal to a lateral width 371 of the center support 300, and the lateral width 970 of the first side support 700.

In one embodiment, the shipping base 100 further includes a third corner support 951, a fourth corner support 952, second and wall 421, third endwall 423, and fourth endwall 424.

Figure 10:
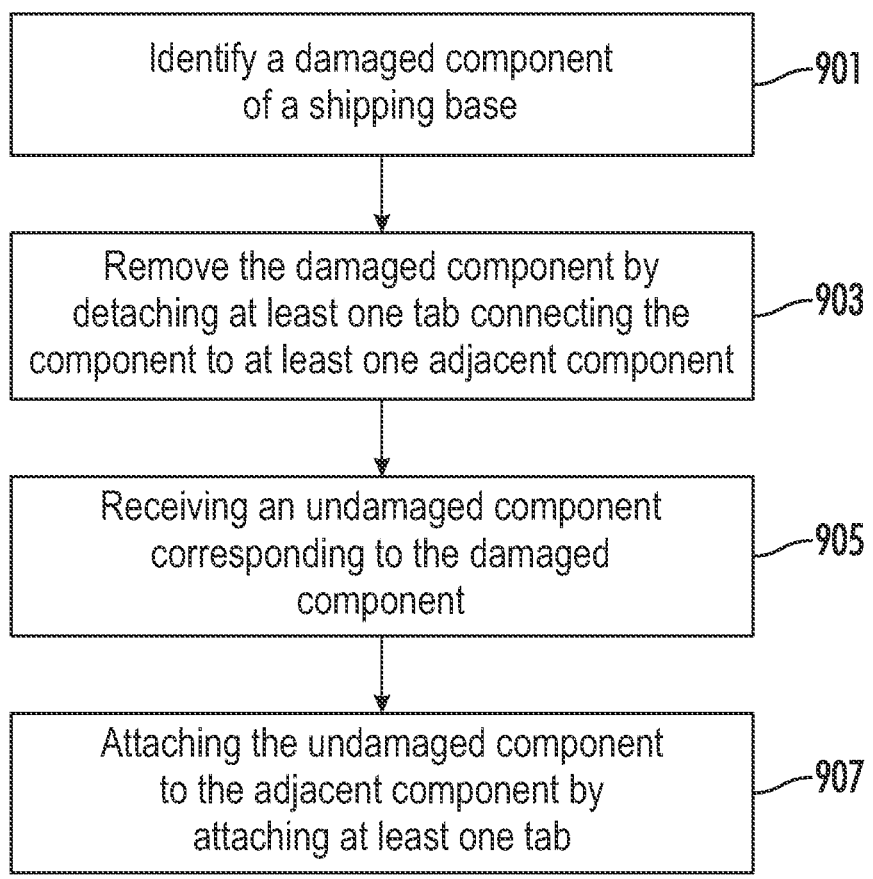
FIG. 10 is a flow chart of a method of repairing a modular shipping base according to one embodiment of the invention.
Figure 11:
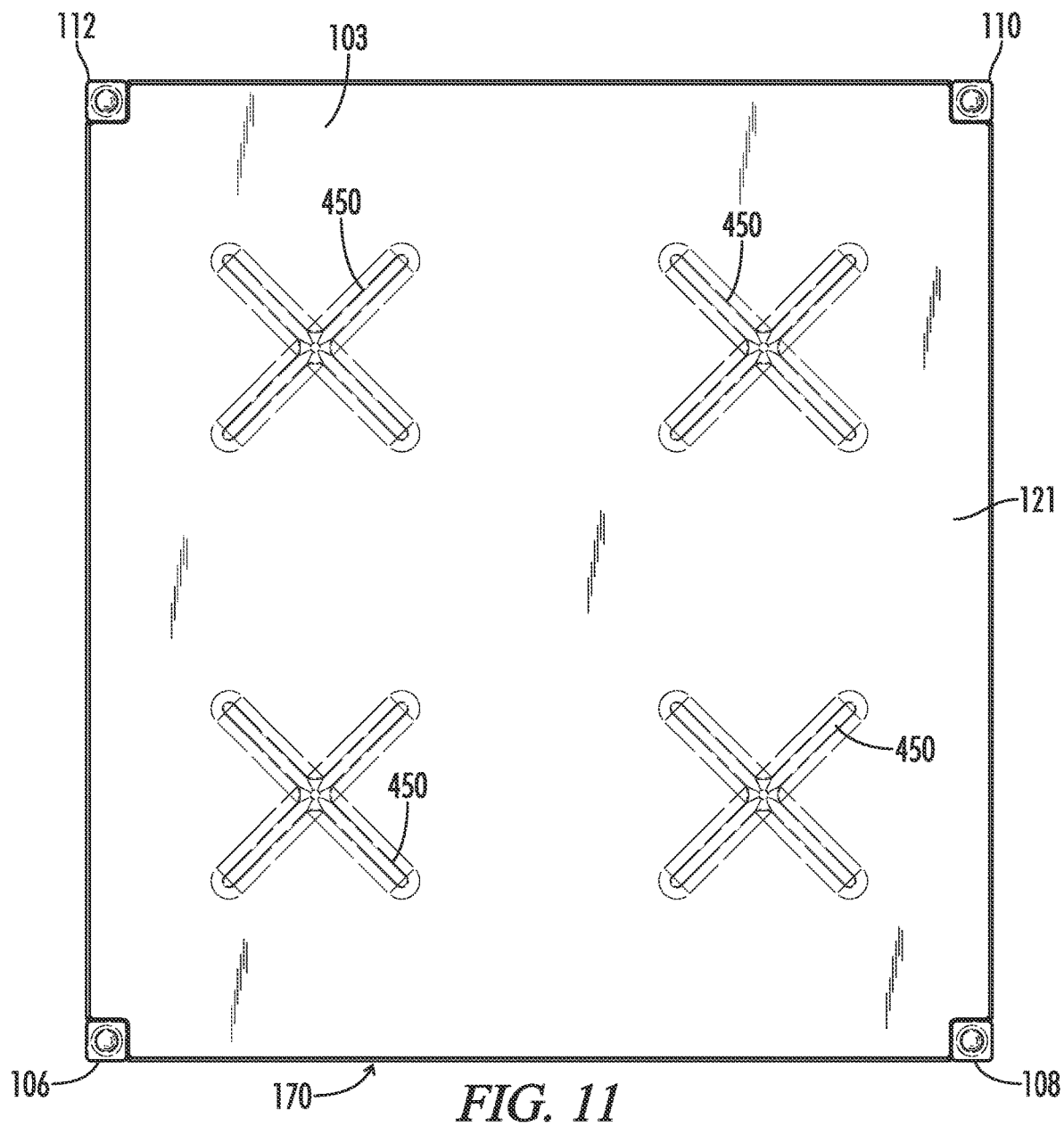
FIG. 11 is an overhead plan view of the modular shipping base of FIG. 1.
Figure 12:
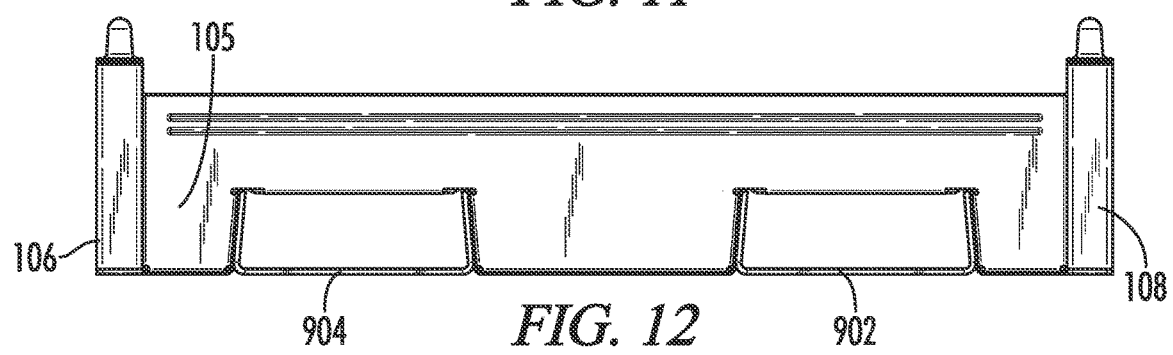
FIG. 12 is a front plan view of the modular shipping base of FIG. 1.
Figure 13:
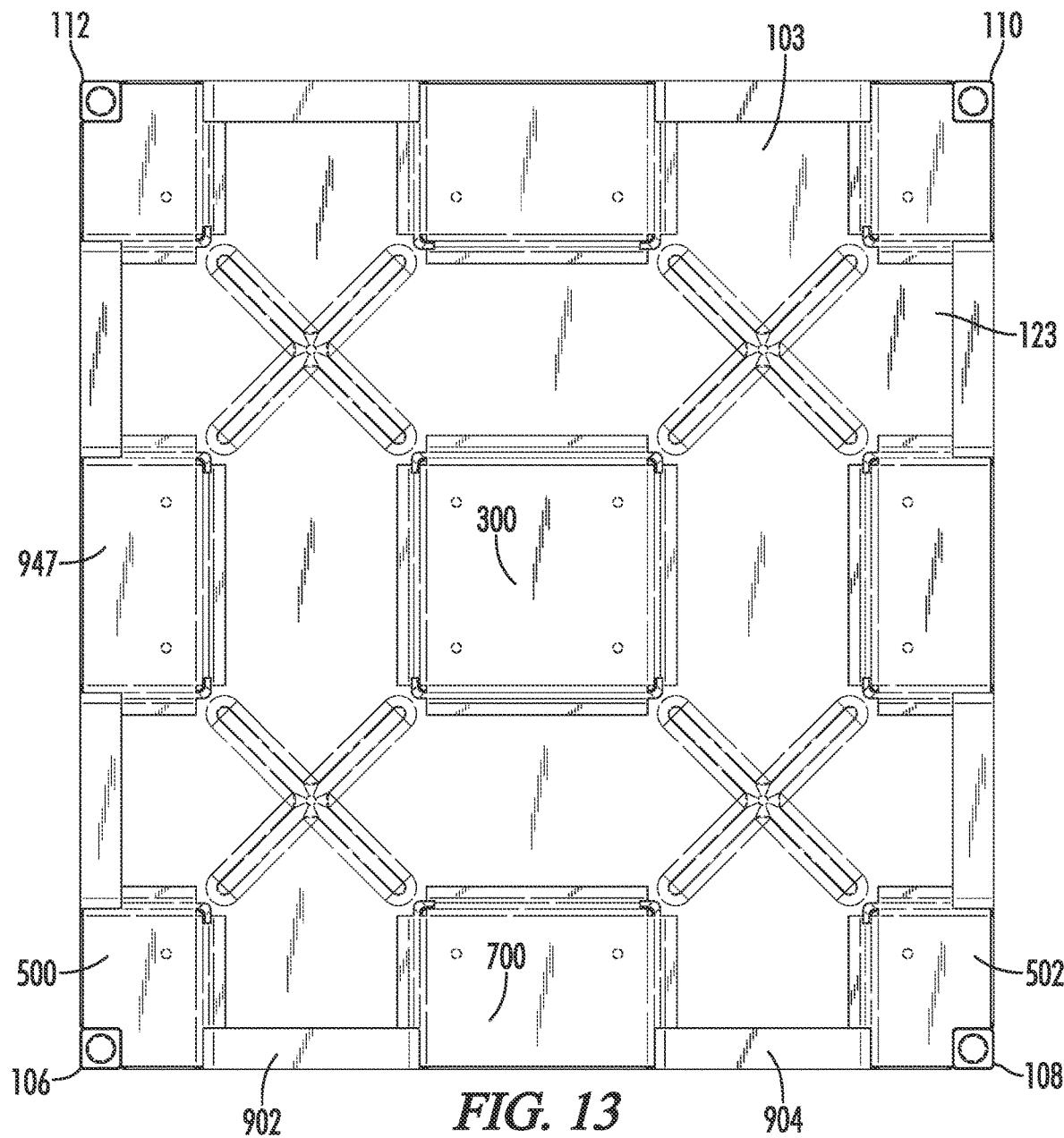
FIG. 13 is a bottom plan view of the modular shipping base of FIG. 1.
Figure 14:
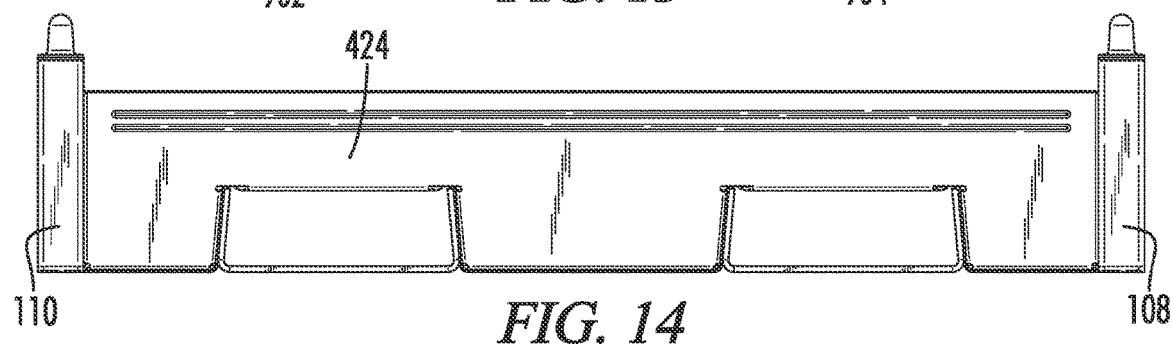
FIG. 14 is a side plan view of the modular shipping base of FIG. 1.

Referring now to FIG. 10, a method of repairing the shipping base 100 begins with identifying a damaged component of the shipping base 100 at 901. At 903, the damaged component is removed by detaching at least one tab connecting the component to at least one adjacent component. At 905, an undamaged component corresponding to the damaged component is received. The undamaged component is attached to the adjacent component by attaching at least one tab of the undamaged component to the adjacent component or at least one tab of the adjacent component to the undamaged component at 907.

In one embodiment, the shipping base 100 includes a spot and/or stitch welded assembly of eight (8) formed-metal component shapes, totaling 14 pieces, and four (4) pieces of a subassembly corner post 106 consisting of three (3) components each (short steel square or rectangular tube 808, stacking cap 806, and stacking socket 804). The count of the formed-metal components may increase for different shipping base 100 sizes and configurations (e.g., multiple side supports 700 may be used). In one embodiment, the count of formed metal components may also be increased by (8) safety straps 902, 904. The formed metal components include sheet metal of various thicknesses, depending on where they are located on the base and their purpose. The formed metal components are generally cut via stamping press tooling (die-sets) and finished using common metal forming tools such as press brakes and shears. Many of these components are universal to all base size configurations (e.g., center support 300 and side support 700), which reduces the amount of tooling required to produce the components for different size shipping bases 100. In one embodiment, the support "feet" or pads on the bottom of the base 100 (e.g., the side supports) that rest on the floor are the same for all base size configurations, and just vary by number and location. The side panels (i.e., endwalls) that form the outside perimeter vertical load structures of the base 100 are formed at different lengths depending on the base size but are made of the same metal thickness and general overall shape, regardless of length. The platform, tray or deck pan 103 is a single stamped piece of metal of a length and width determined by the overall shipping base size being produced. If a non-standard shipping base size is required, standard size base tray panels (e.g., deck pan) and side panels (e.g., endwalls) could be trimmed and welded together during fabrication to develop a shipping base 100 of any practical size. In one embodiment, the only non-stamped metal parts of the shipping base 100 are the corner posts 106. The corner post 106 is fabricated from structural square or rectangular steel tubing. The corner post caps 806 and sockets 804 may be formed via stamping or casting and attached to the body 808 tubing.

In one embodiment, assembly or fabrication is accomplished by electrical resistance welding the stamped metal parts and MIG welding (or TIG welding) the corner posts 106 and corner post caps 804, 806. Once the stamped-metal tooling is produced (i.e., the die sets), all components of the base 100 (except for the corner posts 106) can be mass produced efficiently. There will be some secondary operations to the some parts, mainly attaching support pads/feet, and saw cutting the corner posts. After the parts or components are formed and cut, the components are placed in jigs and welded (i.e., assembled).

The shipping base 100 has been subjected to load testing that exceeds the capacity of most injection molded plastic bases, and approaches the capacity of fully fabricated metal designs. The corner post 106 provides superior capacity for stacking loaded shipping bases to reduce storage and staging floor space. The reduced height of the shipping base 100 over competing designs also means more bases per shipping cube in return shipments, for a lower overall shipping cost per unit to return. The weight of the shipping base 100 obviously varies with overall size. In each shipping base size class, the shipping base 100 is generally 10% lighter than the comparable injection molded shipping base. In one embodiment, the shipping base 100 further includes collapsible side walls and corner post extensions.

Because of the modular design and the type of damage expected to the shipping base 100 from forktruck operators, repair to a damaged shipping base is much simpler and less expensive to implement than any other competing shipping base. Repairing the shipping base 100 is relatively simple (breaking spot welds to remove a component and spot welding a new component back in place), and a repaired shipping base 100 retains the original design strength. Repairs to the other styles of shipping bases, whether cost effective or not, generally takes a depot-level repair facility to perform the work efficiently (i.e., skilled labor and specialized equipment). Repair to the shipping base 100 disclosed herein can benefit from such a depot-level repair facility, but most repairs (e.g., removing and replacing center support 300 and side supports 700) can be performed with a few simple tools that most facility maintenance crews have such as an air chisel, electric grinder, and MIG welder. Because the shipping base 100 is modular and joined by "spot" welds or adhesives and some wire weld seams (e.g., MIG or TIG welded continuous or skip), damaged parts can be removed by chiseling apart the spot welds or grinding out those few welds that cannot be chiseled efficiently. The removed part(s) are then replaced with standardized replacement parts kept in stock for such purposes. The decision whether to repair or replace a damaged shipping base is generally determined by counting the number of parts needing replacement, adding a standardized labor time estimate for each piece replaced, and comparing that cost to the cost of a new base. The labor rate used in the labor time estimate is relatively low because the repairs described herein (breaking spot welds and creating new spot or rosette welds with a MIG welder) are within the skills of general maintenance personnel at manufacturing facilities and other industrial locations and shipping docks.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MODULAR SHIPPING BASE it is not intended that such references be construed as limitations upon the scope of this invention except as set forth in the following claims

What is claimed is:

1. A shipping base for supporting product during storage and transportation of the product, said shipping base comprising:
    a deck pan configured to extend generally horizontally when the shipping base is assembled and in an upright position, said deck pan configured to support product for storage and transportation on a top of said deck pan;
    a center support configured to attach to a bottom of the deck pan at a center of the deck pan and space the deck pan from a surface supporting the shipping base when the shipping base is assembled and in the upright position, wherein the center support comprises:
        a first pair of opposing sidewalls extending generally vertically when the shipping base is assembled and in the upright position;
        a second pair of opposing sidewalls extending generally vertically when the shipping base is assembled and in the upright position; and
        horizontal tabs extending generally horizontally and outwardly from each sidewall of the center support at a top of the center support, wherein
    each tab is attached to the bottom of the deck pan when the shipping base is assembled;
    a first corner support configured to attach to the bottom of the deck pan at a corner of the deck pan and at a front end of the shipping base and space the deck pan from the surface supporting the shipping base when the shipping base is assembled and in the upright position;
    a second corner support configured to attach to the bottom of the deck pan at a second corner of the deck pan and at the front end of the shipping base and space the deck pan from the surface supporting the shipping base when the shipping base is assembled and in the upright position; and
    an endwall configured to extend along the front end of the shipping base and engage the deck pan, first corner support, and second corner support when the shipping base is assembled and in the upright position.

2. The shipping base of claim 1, wherein the center support comprises:
    a piece of sheet metal stamped or cut to shape and folded to form:
        a bottom extending generally horizontally when the shipping base is assembled and in the upright position;
        the first pair of opposing sidewalls; and
        the second pair of opposing sidewalls, wherein:
    each sidewall of said first pair of opposing sidewalls comprises opposing lateral tabs, wherein a first lateral tab of the opposing lateral tabs is configured to attach to a first sidewall of the second pair of opposing sidewalls, and a second lateral tab of the opposing lateral tabs is configured to attach to a second sidewall of the second pair of opposing sidewalls such that the lateral tabs, when attached, maintain the center support in a generally open-top box configuration.

3. The shipping base of claim 1, wherein the center support comprises:
the first pair of opposing sidewalls extending generally vertically when the shipping base is assembled and in the upright position; and
the second pair of opposing sidewalls extending generally vertically when the shipping base is assembled and in the upright position;
wherein a lateral length of the first pair of opposing sidewalls at a bottom of the center support is the same as a longitudinal length of the second pair of opposing sidewalls at the bottom of the center support.

4. The shipping base of claim 1, wherein the deck pan is generally rectangular, and the deck pan comprises a cut out at each corner configured to receive a corner post of the shipping base.

5. The shipping base of claim 1, wherein the deck pan comprises:
a first pair of opposing edges;
a second pair of opposing edges;
a surface configured to support the product when the shipping base is supporting product during storage or transportation of the product;
a first tab extending generally vertically from the surface of the deck pan at a first edge of the first pair of opposing edges when the shipping base is assembled and in the upright position;
a second tab extending generally vertically from the surface of the deck pan at a second edge of the first pair of opposing edges when the shipping base is assembled and in the upright position;
a third tab extending generally vertically from the surface of the deck pan at a first edge of the second pair of opposing edges when the shipping base is assembled and in the upright position; and
a fourth tab extending generally vertically from the surface of the deck pan at a second edge of the second pair of opposing edges when the shipping base is assembled and in the upright position.

6. The shipping base of claim 1, wherein the deck pan comprises:
a first pair of opposing edges;
a second pair of opposing edges;
a surface configured to support the product when the shipping base is supporting product during storage or transportation of the product;
a first tab extending generally upward from the surface of the deck pan at a first edge of the first pair of opposing edges when the shipping base is assembled and in the upright position;
a second tab extending generally upward from the surface of the deck pan at a second edge of the first pair of opposing edges when the shipping base is assembled and in the upright position;
a third tab extending generally upward from the surface of the deck pan at a first edge of the second pair of opposing edges when the shipping base is assembled and in the upright position; and
a fourth tab extending generally upward from the surface of the deck pan at a second edge of the second pair of opposing edges when the shipping base is assembled and in the upright position.

7. The shipping base of claim 1, wherein the deck pan comprises:
a first pair of opposing edges;
a second pair of opposing edges;
a surface configured to support the product when the shipping base is supporting product during storage or transportation of the product;
a first tab extending generally upward from the surface of the deck pan at a first edge of the first pair of opposing edges when the shipping base is assembled and in the upright position;
a second tab extending generally upward from the surface of the deck pan at a second edge of the first pair of opposing edges when the shipping base is assembled and in the upright position;
a third tab extending generally upward from the surface of the deck pan at a first edge of the second pair of opposing edges when the shipping base is assembled and in the upright position; and
a fourth tab extending generally upward from the surface of the deck pan at a second edge of the second pair of opposing edges when the shipping base is assembled and in the upright position, wherein:
the first tab is configured to attach to the endwall when the shipping base is assembled.

8. The shipping base of claim 1, wherein the deck pan comprises:
a first pair of opposing edges;
a second pair of opposing edges;
a surface configured to support the product when the shipping base is supporting product during storage or transportation of the product;
a first tab extending generally upward from the surface of the deck pan at a first edge of the first pair of opposing edges when the shipping base is assembled and in the upright position;
a second tab extending generally upward from the surface of the deck pan at a second edge of the first pair of opposing edges when the shipping base is assembled and in the upright position;
a third tab extending generally upward from the surface of the deck pan at a first edge of the second pair of opposing edges when the shipping base is assembled and in the upright position; and
a fourth tab extending generally upward from the surface of the deck pan at a second edge of the second pair of opposing edges when the shipping base is assembled and in the upright position, wherein:
the endwall is a first endwall;
the shipping base further comprises a second endwall, a third endwall, and a fourth endwall;
the first tab is configured to attach to the first endwall when the shipping base is assembled;
the second tab is configured to attach to the second endwall when the shipping base is assembled;
the third tab is configured to attach to the third endwall when the shipping base is assembled; and
the fourth tab is configured to attach to the fourth endwall when the shipping base is assembled.

9. The shipping base of claim 1, wherein the deck pan comprises a surface configured to support the product when the shipping base is supporting product during storage or transportation of the product; and
the surface comprises an embossment configured to stiffen the surface.

10. The shipping base of claim 1, wherein:
the deck pan comprises a surface configured to support the product when the shipping base is supporting product during storage or transportation of the product;
the surface of the deck pan is generally rectangular such that the surface has quadrants; and
the surface comprises an embossment in each quadrant, said embossments configured to stiffen the surface.

11. The shipping base of claim 1, wherein:
the deck pan comprises a surface configured to support the product when the shipping base is supporting product during storage or transportation of the product;
the surface of the deck pan is generally rectangular such that the surface has quadrants;
the surface comprises an embossment in each quadrant, said embossments configured to stiffen the surface;
each embossment is generally centered in the quadrant;
each embossment is generally x shaped.

12. The shipping base of claim 1, wherein the first corner support comprises a horizontal tab extending generally horizontally at a top of the first corner support, wherein the horizontal tab is attached to the deck pan when the shipping base is assembled and in the upright position.

13. The shipping base of claim 1, wherein the first corner support comprises:
a bottom configured to contact the surface supporting the shipping base when the shipping base is assembled and in an upright position, wherein the bottom is generally rectangular such that the bottom has four edges;
a first sidewall configured to extend upwardly from the bottom along a first edge of the four edges of the bottom when the first corner support is in the upright position; and
a second sidewall configured to extend upwardly from the bottom along a second edge of the four edges of the bottom when the first corner support is in the upright position, wherein:
the first edge is adjacent the second edge.

14. The shipping base of claim 1, wherein the first corner support comprises:
a bottom configured to contact the surface supporting the shipping base when the shipping base is assembled and in an upright position, wherein the bottom is generally rectangular such that the bottom has four edges;
a first sidewall configured to extend upwardly from the bottom along a first edge of the four edges of the bottom when the first corner support is in the upright position;
a second sidewall configured to extend upwardly from the bottom along a second edge of the four edges of the bottom when the first corner support is in the upright position, wherein the first edge is adjacent the second edge;
a first horizontal tab extending generally horizontally from a top of the first sidewall and attached to the deck pan when the shipping base is assembled and in the upright position; and
a second horizontal tab extending generally horizontally from a top of the second sidewall and attached to the deck pan when the shipping base is assembled and in the upright position.

15. The shipping base of claim 1, wherein the first corner support comprises:
a bottom configured to contact the surface supporting the shipping base when the shipping base is assembled and in an upright position, wherein the bottom is generally rectangular such that the bottom has four edges;
a first sidewall configured to extend upwardly from the bottom along a first edge of the four edges of the bottom when the first corner support is in the upright position;
a second sidewall configured to extend upwardly from the bottom along a second edge of the four edges of the bottom when the first corner support is in the upright position, wherein the first edge is adjacent the second edge;
a first horizontal tab extending generally horizontally and rearwardly from a top of the first sidewall and attached to the deck pan when the shipping base is assembled and in the upright position; and
a second horizontal tab extending generally horizontally and laterally from a top of the first sidewall and attached to the deck pan when the shipping base is assembled and in the upright position.

16. The shipping base of claim 1, wherein the first corner support comprises:
a bottom configured to contact the surface supporting the shipping base when the shipping base is assembled and in an upright position, wherein the bottom is generally rectangular such that the bottom has four edges;
a first sidewall configured to extend upwardly from the bottom along a first edge of the four edges of the bottom when the first corner support is in the upright position; and
a second sidewall configured to extend upwardly from the bottom along a second edge of the four edges of the bottom when the first corner support is in the upright position, wherein:
the first edge is adjacent the second edge;
a third edge of the four edges and a fourth edge of the four edges do not meet such that a cut out is formed in the generally rectangular bottom, said cut out configured to receive a corner post of the shipping base.

17. The shipping base of claim 1, wherein the first corner support comprises:
a piece of sheet metal stamped or cut to shape and folded to form:
a bottom extending generally horizontally when the shipping base is assembled and in the upright position, wherein the bottom is generally rectangular such that the bottom has four edges;
a first sidewall configured to extend upwardly from the bottom along a first edge of the four edges of the bottom when the first corner support is in the upright position; and
a second sidewall configured to extend upwardly from the bottom along a second edge of the four edges of the bottom when the first corner support is in the upright position, wherein:
the first edge is adjacent the second edge;
the first sidewall comprises a lateral tab configured to attach to the second sidewall when the shipping based is assembled such that the lateral tab retains the corner support with the first and second sidewall generally perpendicular to the bottom of the first corner support.

18. The shipping base of claim 1, wherein the first corner support spaces the deck pan from the surface supporting the shipping base the same distance as the center support spaces the deck pan from the surface supporting the shipping base when the shipping base is assembled and in the upright position and supported by the surface.

19. The shipping base of claim 1, wherein the endwall is the front endwall, and the endwall comprises:

a main wall configured to extend laterally from the first corner support to the second corner support when the shipping base is assembled; and a deck tab configured to extend rearwardly from the main wall when the shipping base is assembled, said deck tab having a height equal to a distance which the center support spaces the deck pan from the surface supporting the shipping base, and wherein said deck tab is configured to attach to the bottom of the deck pan when the shipping base is assembled and in the upright position.

20. The shipping base of claim 1, wherein the endwall is the front endwall, and the endwall comprises:
    a main wall configured to extend laterally from the first corner support to the second corner support when the shipping base is assembled; wherein the main wall has an embossment extending laterally along the main wall at a height above the deck pan when the shipping base is assembled and in the upright position.

21. The shipping base of claim 1, wherein the endwall is the front endwall, wherein the endwall is configured to attach to the deck pan, the first corner support, the second corner support, and a side support when the shipping base is assembled and in the upright position, and the endwall comprises:
    a main wall configured to extend laterally from the first corner support to the second corner support when the shipping base is assembled; and
    a deck tab configured to extend rearwardly from the main wall when the shipping base is assembled, said deck tab having a height equal to a distance which the center support spaces the deck pan from the surface supporting the shipping base, and wherein said deck tab is configured to attach to the bottom of the deck pan when the shipping base is assembled and in the upright position; and wherein:
    the endwall has a pair of recesses configured to receive forks for lifting or moving the shipping base, wherein a first recess of the pair of recesses is between where the endwall attaches to the first corner support and the side support, and the second recess of the pair of recesses is between where the endwall attached to the side support and the second corner support;
    the deck tab is a first deck tab defining a top of the first recess; and
    the endwall further comprises a second deck tab defining a top of the second recess.

22. The shipping base of claim 1, wherein the endwall is the front endwall, wherein the endwall is configured to attach to the deck pan, the first corner support, and the second corner support when the shipping base is assembled and in the upright position, and the endwall comprises:
    a main wall configured to extend laterally from the first corner support to the second corner support when the shipping base is assembled;
    a pair of corner post tabs extending rearwardly and vertically from the main wall when the shipping base is assembled and in the upright position to form the lateral ends of the main wall, wherein each corner post tab is configured to attach to a corner post of the shipping base when the shipping base is assembled and in the upright position.

23. The shipping base of claim 1, wherein the endwall is the front endwall, wherein the endwall is configured to attach to the deck pan, the first corner support, and the second corner support when the shipping base is assembled and in the upright position, and the endwall comprises:
    a main wall configured to extend laterally from the first corner support to the second corner support when the shipping base is assembled;
    a pair of corner post tabs extending rearwardly and vertically from the main wall when the shipping base is assembled and in the upright position to form the lateral ends of the main wall, wherein each corner post tab is configured to attach to a corner post of the shipping base when the shipping base is assembled, and wherein:
    the main wall has a lateral length less than a lateral length of the deck pan by approximately a total lateral length of the corner posts less double a thickness of the main wall of the endwall.

24. The shipping base of claim 1 further comprising a side support, wherein:
    the side support is configured to attach to the deck pan and the endwall and space the deck pan from the surface supporting the shipping base when the shipping base is assembled and in the upright position.

25. The shipping base of claim 1 further comprising a side support, wherein:
    the side support is configured to attach to the deck pan and the endwall and space the deck pan from the surface supporting the shipping base when the shipping base is assembled and in the upright position; and
    the side support spaces the deck pan from the surface supporting the shipping base the same distance as the center support spaces the deck pan from the surface supporting the shipping base when the shipping base is assembled and in the upright position and supported by the surface.

26. The shipping base of claim 1 further comprising a side support, wherein:
    the side support is configured to attach to the deck pan and the endwall and space the deck pan from the surface supporting the shipping base when the shipping base is assembled and in the upright position; and
    the side support comprises a bottom;
    a rear wall extending upwardly from the bottom when the shipping base is assembled and in the upright position;
    a tab extending horizontally from a top of the rear wall, said tab configured to attach to the deck pan when the shipping base is assembled and in the upright position.

27. The shipping base of claim 1 further comprising a side support, wherein:
    the side support is configured to attach to the deck pan and the endwall and space the deck pan from the surface supporting the shipping base when the shipping base is assembled and in the upright position; and
    the side support comprises a bottom configured to attach to a bottom side support tab of the endwall when the shipping base is assembled;
    a rear wall extending upwardly from the bottom when the shipping base is assembled and in the upright position;
    a tab extending horizontally from a top of the rear wall, said tab configured to attach to the deck pan when the shipping base is assembled and in the upright position.

28. The shipping base of claim 1 further comprising a side support, wherein:
    the side support is configured to attach to the deck pan and the endwall and space the deck pan from the surface supporting the shipping base when the shipping base is assembled and in the upright position; and
    the side support comprises a bottom;
    a rear wall extending upwardly from the bottom when the shipping base is assembled and in the upright position;

a tab extending horizontally from a top of the rear wall, said tab configured to attach to the deck pan when the shipping base is assembled and in the upright position; and a pair of opposing sidewalls wherein:
  a first sidewall of the pair of opposing sidewalls extends upwardly from the bottom when the shipping base is assembled and in the upright position; and
  a second sidewall of the pair of opposing sidewalls extends upwardly from the bottom when the shipping base is assembled and in the upright position.

29. The shipping base of claim 1 further comprising a side support, wherein:
  the side support is configured to attach to the deck pan and the endwall and space the deck pan from the surface supporting the shipping base when the shipping base is assembled and in the upright position; and
  the side support comprises a bottom;
  a rear wall extending upwardly from the bottom when the shipping base is assembled and in the upright position;
  a tab extending horizontally from a top of the rear wall, said tab configured to attach to the deck pan when the shipping base is assembled and in the upright position, wherein the tab is a rear deck pan tab; a pair of opposing sidewalls wherein:
    a first sidewall of the pair of opposing sidewalls extends upwardly from the bottom when the shipping base is assembled and in the upright position; and
    a second sidewall of the pair of opposing sidewalls extends upwardly from the bottom when the shipping base is assembled and in the upright position; and
  a first deck pan tab extending generally horizontally and outwardly from the first sidewall when the shipping base is assembled and in the upright position, wherein the first deck pan tab is configured to attach to a bottom of the deck pan when the shipping base is assembled and in the upright position; and
  a second deck pan tab extending generally horizontally and outwardly form the second sidewall when the shipping base is assembled and in the upright position, wherein the second deck pan tab is configured to attach to the bottom of the deck pan when the shipping base is assembled and in the upright position.

30. The shipping base of claim 1 further comprising a side support, wherein:
  the side support is configured to attach to the deck pan and the endwall and space the deck pan from the surface supporting the shipping base when the shipping base is assembled and in the upright position; and
  the side support comprises a bottom;
  a rear wall extending upwardly from the bottom when the shipping base is assembled and in the upright position;
  a tab extending horizontally from a top of the rear wall, said tab configured to attach to the deck pan when the shipping base is assembled and in the upright position; and
  a pair of opposing sidewalls wherein:
    a first sidewall of the pair of opposing sidewalls extends upwardly from the bottom when the shipping base is assembled and in the upright position;
    a second sidewall of the pair of opposing sidewalls extends upwardly from the bottom when the shipping base is assembled and in the upright position; and
    each sidewall of the pair of opposing sidewalls has a rear wall tab configured to attach to the rear wall when the shipping base is assembled.

31. The shipping base of claim 1 further comprising a side support, wherein the side support comprises:
  a piece of sheet metal stamped or cut to shape and folded to form:
    a bottom extending generally horizontally when the shipping base is assembled and in the upright position;
    a pair of opposing sidewalls; and
    a rear wall, wherein
  each sidewall of said first pair of opposing sidewalls comprises a rear wall tab, wherein the rear wall tabs are configured to attach to the rear wall such that the rear wall tabs, when attached, maintain the center support in a generally open-top, open front box configuration.

32. The shipping base of claim 1 further comprising a corner post, wherein said corner post comprises:
  a rectangular tube body configured to extend upwardly at a corner of the deck pan when the shipping base is assembled and in the upright position, wherein:
    the body has a first flat side configured to attach to a corner post tab of the endwall when the shipping base is assembled, wherein the endwall is a first endwall; and
    the body has a second flat side adjacent the first flat side configured to attach to a corner post tab of a second endwall when the shipping base is assembled, wherein the second endwall is a sidewall of the shipping base.

33. The shipping base of claim 1 further comprising a corner post, wherein said corner post comprises:
  a rectangular tube body configured to extend upwardly at a corner of the deck pan when the shipping base is assembled and in the upright position; and
  an endcap at a bottom end of the corner post, wherein the endcap has a recess configured to receive a post cap of a corner post of another shipping base upon which the shipping base is properly stacked when said shipping base is assembled and in the upright position.

34. The shipping base of claim 1 further comprising a corner post, wherein said corner post comprises:
  a rectangular tube body configured to extend upwardly at a corner of the deck pan when the shipping base is assembled and in the upright position; and
  an endcap at a bottom end of the corner post, wherein the endcap has a recess configured to receive a post cap of a corner post of another shipping base upon which the shipping base is properly stacked when said shipping base is assembled and in the upright position, wherein said recess is a hole through the endcap of the corner post.

35. The shipping base of claim 1 further comprising a corner post, wherein said corner post comprises:
  a rectangular tube body configured to extend upwardly at a corner of the deck pan when the shipping base is assembled and in the upright position; and
  a post cap, wherein the post cap comprises a protrusion configured to extend into a recess in an endcap of a corner post of another shipping base properly stacked on the shipping base when said shipping base is assembled and in the upright position.

36. The shipping base of claim 1 further comprising a corner post, wherein said corner post comprises:
  a rectangular tube body configured to extend upwardly at a corner of the deck pan when the shipping base is assembled and in the upright position, wherein the rectangular body has a height at least as great as a height of the endwall when the shipping base is assembled and in the upright position.

37. The shipping base of claim 1 further comprising:
a side support, wherein the side support is configured to attach to the deck pan and the endwall and space the deck pan from the surface supporting the shipping base when the shipping base is assembled and in the upright position;
a first strap configured to extend between the first corner support and the side support, said first strap having a bottom section approximately equal in height to a bottom of the first corner support when the shipping base is assembled and in the upright position on the surface supporting the shipping base.

38. The shipping base of claim 1 further comprising:
a side support, wherein the side support is configured to attach to the deck pan and the endwall and space the deck pan from the surface supporting the shipping base when the shipping base is assembled and in the upright position;
a first strap configured to extend between the first corner support and the side support, said first strap having a bottom section approximately equal in height to a bottom of the first corner support when the shipping base is assembled and in the upright position on the surface supporting the shipping base; and
a second strap configured to extend between the second corner support and the side support, said second strap having a bottom section approximately equal in height to a bottom of the second corner support when the shipping base is assembled and in the upright position on the surface supporting the shipping base.

39. The shipping base of claim 1 further comprising:
a side support, wherein the side support is configured to attach to the deck pan and the endwall and space the deck pan from the surface supporting the shipping base when the shipping base is assembled and in the upright position;
a first strap configured to extend between the first corner support and the side support, said first strap having a bottom section approximately equal in height to a bottom of the first corner support when the shipping base is assembled and in the upright position on the surface supporting the shipping base, wherein the first strap further comprises:
a first upright section configured to extend upwardly from the bottom section of the first strap along a sidewall of the first corner support and attach to said sidewall when the shipping base is assembled and in the upright position; and
a second upright section configured to extend upwardly from the bottom section of the first strap along a sidewall of the side support and attach to said sidewall when the shipping base is assembled and in the upright position.

40. The shipping base of claim 1 further comprising:
a side support, wherein the side support is configured to attach to the deck pan and the endwall and space the deck pan from the surface supporting the shipping base when the shipping base is assembled and in the upright position;
wherein a longitudinal depth of the side support is the same as a longitudinal depth of the first corner support and a longitudinal depth of the second corner support.

41. The shipping base of claim 1 further comprising:
a side support, wherein the side support is configured to attach to the deck pan and the endwall and space the deck pan from the surface supporting the shipping base when the shipping base is assembled and in the upright position;
wherein the side support has a lateral width equal to a lateral width of the center support.

42. The shipping base of claim 1 further comprising:
a side support, wherein the side support is configured to attach to the deck pan and the endwall and space the deck pan from the surface supporting the shipping base when the shipping base is assembled and in the upright position, wherein the endwall is a first endwall and the side support is a second side support;
a second endwall adjacent the first endwall such that the second endwall at least partially forms a side of the shipping base when the shipping base is assembled; and
a second side support configured to attach to the second endwall, wherein a longitudinal depth of the second side support is equal to a lateral width of the center support.

43. The shipping base of claim 1 further comprising:
a side support, wherein the side support is configured to attach to the deck pan and the endwall and space the deck pan from the surface supporting the shipping base when the shipping base is assembled and in the upright position, wherein the endwall is a first endwall and the side support is a second side support;
a second endwall adjacent the first endwall such that the second endwall at least partially forms a side of the shipping base when the shipping base is assembled; and
a second side support configured to attach to the second endwall, wherein a longitudinal depth of the second side support is equal to a lateral width of the center support, a longitudinal length of the center support, and a lateral width of the first side support.

44. The shipping base of claim 1, wherein the endwall is a first endwall, wherein the shipping base further comprises:
a third corner support;
a fourth corner support;
a second endwall;
a third endwall; and
a fourth endwall.

45. The shipping base of claim 1, wherein the endwall is a first endwall, wherein the shipping base further comprises:
a third corner support;
a fourth corner support;
a second endwall;
a third endwall;
a fourth endwall;
a first side support;
a second side support;
a third side support; and
a fourth side support.

46. The shipping base of claim 1, wherein the endwall is a first endwall, wherein the shipping base further comprises:
a third corner support;
a fourth corner support;
a second endwall;
a third endwall;
a fourth endwall;
a first side support;
a second side support;
a third side support;
a fourth side support;
a first corner post;
a second corner post;

a third corner post; and
a fourth corner post.

47. A method of repairing a shipping base, said method comprising:
- identifying a damaged component of the shipping base, said damaged component of the shipping base comprising at least one of the following:
  - a deck pan configured to extend generally horizontally when the shipping base is in an upright position, said deck pan configured to support product for shipping on a top of said deck pan;
  - a center support configured to attach to a bottom of the deck pan at a center of the deck pan and space the deck pan from a surface supporting the shipping base when the shipping base is assembled and in the upright position, wherein the center support comprises:
    - a first pair of opposing sidewalls extending generally vertically when the shipping base is assembled and in the upright position;
    - a second pair of opposing sidewalls extending generally vertically when the shipping base is assembled and in the upright position; and
    - horizontal tabs extending generally horizontally and outwardly from each sidewall of the center support at a top of the center support,
    wherein each tab is attached to the bottom of the deck pan when the shipping base is assembled;
  - a first corner support configured to attach to the bottom of the deck pan at a corner of the deck pan and at a front end of the shipping base and space the deck pan from the surface supporting the shipping base when the shipping base is assembled and in the upright position;
  - a second corner support configured to attach to the bottom of the deck pan at a corner of the deck pan and at the front end of the shipping base and space the deck pan from the surface supporting the shipping base when the shipping base is assembled and in the upright position;
  - an endwall configured to extend along the front end of the shipping base and engage the deck pan, first corner support, and second corner support when the shipping base is assembled and in the upright position;
  - a third corner support;
  - a fourth corner support;
  - a second endwall;
  - a third endwall;
  - a fourth endwall;
  - a first side support;
  - a second side support;
  - a third side support;
  - a fourth side support;
  - a first corner post;
  - a second corner post;
  - a third corner post; or
  - a fourth corner post;
- removing the damaged component by detaching at least one tab connecting the component to at least one adjacent component;
- receiving an undamaged component corresponding to the damaged component; and
- attaching the undamaged component to the adjacent component by attaching at least one tab of the undamaged component to the adjacent component or at least one tab of the adjacent component to the undamaged component.

48. A center support for a shipping base comprising a deck pan, said center support comprising:
- a horizontal tab extending generally horizontally at a top of the center support, wherein:
  - the center support is configured to attach to a bottom of the deck pan at a center of the deck pan and space the deck pan from a surface supporting the shipping base when the shipping base is assembled and in the upright position; and
  - the horizontal tab is attached to the deck pan when the shipping base is assembled and in the upright position to attach the center support to the deck pan;
- a first pair of opposing sidewalls extending generally vertically when the shipping base is assembled and in the upright position;
- a second pair of opposing sidewalls extending generally vertically when the shipping base is assembled and in the upright position; and
- horizontal tabs extending generally horizontally and outwardly from each sidewall of the center support at a top of the center support, wherein each tab is attached to the bottom of the deck pan when the shipping base is assembled.

49. The center support of claim 48, wherein the center support comprises:
- a piece of sheet metal stamped or cut to shape and folded to form:
  - a bottom extending generally horizontally when the shipping base is assembled and in the upright position;
  - the first pair of opposing sidewalls; and
  - the second pair of opposing sidewalls, wherein:
- each sidewall of said first pair of opposing sidewalls comprises opposing lateral tabs, wherein a first lateral tab of the opposing lateral tabs is configured to attach to a first sidewall of the second pair of opposing sidewalls, and a second lateral tab of the opposing lateral tabs is configured to attach to a second sidewall of the second pair of opposing sidewalls such that the lateral tabs, when attached, maintain the center support in a generally open-top box configuration.

50. The center support of claim 1, wherein the center support comprises:
- the first pair of opposing sidewalls extending generally vertically when the shipping base is assembled and in the upright position; and
- the second pair of opposing sidewalls extending generally vertically when the shipping base is assembled and in the upright position;
- wherein a lateral length of the first pair of opposing sidewalls at a bottom of the center support is the same as a longitudinal length of the second pair of opposing sidewalls at the bottom of the center support.

* * * * *